US008726161B2

(12) United States Patent
Ubillos et al.

(10) Patent No.: US 8,726,161 B2
(45) Date of Patent: May 13, 2014

(54) VISUAL PRESENTATION COMPOSITION

(75) Inventors: Randy Ubillos, Los Altos, CA (US);
Michael P. Leong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 13/090,099

(22) Filed: Apr. 19, 2011

(65) Prior Publication Data

US 2012/0096356 A1 Apr. 19, 2012

Related U.S. Application Data

(60) Provisional application No. 61/394,741, filed on Oct. 19, 2010.

(51) Int. Cl.
*G06F 3/00* (2006.01)
*G06F 3/048* (2013.01)

(52) U.S. Cl.
USPC ........... 715/723; 715/719; 715/720; 715/721; 715/724; 715/725

(58) Field of Classification Search
USPC .................................. 715/719–721, 723–725
See application file for complete search history.

(56) References Cited

U.S. PATENT DOCUMENTS

| | | | |
|---|---|---|---|
| 5,715,325 A * | 2/1998 | Bang et al. ..................... | 382/118 |
| 6,292,575 B1 * | 9/2001 | Bortolussi et al. ............ | 382/118 |
| 6,754,389 B1 * | 6/2004 | Dimitrova et al. ............ | 382/224 |
| 6,930,687 B2 * | 8/2005 | Grosvenor et al. ........... | 345/473 |
| 6,954,894 B1 * | 10/2005 | Balnaves et al. .............. | 715/202 |
| 7,146,028 B2 | 12/2006 | Lestideau | |
| 7,248,778 B1 * | 7/2007 | Anderson et al. ............. | 386/280 |
| 7,336,830 B2 * | 2/2008 | Porter et al. .................. | 382/218 |
| 7,362,919 B2 * | 4/2008 | Das et al. ...................... | 382/284 |
| 7,469,054 B2 * | 12/2008 | Aratani et al. ................ | 382/118 |

(Continued)

FOREIGN PATENT DOCUMENTS

| | | |
|---|---|---|
| WO | WO0039997 A2 | 7/2000 |
| WO | WO2006025272 A1 | 3/2006 |
| WO | WO2007104372 A1 | 9/2007 |

OTHER PUBLICATIONS

Ariki, et al., "Face Indexing on Video Data—Extraction, Recognition, Tracking and Modeling", Dept. of Electronics and Informatics, Ryukoku University, Seta, Otsu-shi, 520-2194, Japan, 1998, 6 pages.

(Continued)

*Primary Examiner* — Steven B Theriault
(74) *Attorney, Agent, or Firm* — Kenyon & Kenyon LLP

(57) ABSTRACT

Methods, systems and/or computer program products are disclosed that help facilitate visual presentation composition. A method includes analyzing a plurality of video clips, each video clip comprising a plurality of frames, to determine a subset of the plurality of video clips that have at least one frame depicting one or more faces. The method further includes presenting, in a user interface of a video editing application, the determined subset of video clips along with indicia indicating one or more face-related characteristics of each of the subset of video clips. Furthermore, the method includes receiving, from a user of the video editing application, a selection of one or more frames of at least one of the subset of video clips to populate a shot placeholder in a movie-building template, and generating a playable media file representing a movie based at least in part on the selection received from the user.

23 Claims, 15 Drawing Sheets

(56) References Cited

U.S. PATENT DOCUMENTS

| | | | |
|---|---|---|---|
| 7,500,176 B2 | 3/2009 | Thomson et al. | |
| 7,512,537 B2 | 3/2009 | Pahud et al. | |
| 7,555,149 B2* | 6/2009 | Peker et al. | 382/118 |
| 7,606,397 B2* | 10/2009 | Kowald | 382/118 |
| 7,634,106 B2* | 12/2009 | Mino et al. | 382/103 |
| 7,694,213 B2* | 4/2010 | Kuwabara et al. | 715/201 |
| 7,711,145 B2* | 5/2010 | Gallagher | 382/103 |
| 7,800,615 B2* | 9/2010 | MacPherson | 345/440 |
| 7,826,644 B2* | 11/2010 | Sharma et al. | 382/118 |
| 7,840,898 B2* | 11/2010 | Hua et al. | 715/723 |
| 7,881,505 B2* | 2/2011 | Schneiderman et al. | 382/118 |
| 7,916,894 B1* | 3/2011 | Dhillon et al. | 382/103 |
| 8,116,536 B2* | 2/2012 | Okada et al. | 382/118 |
| 8,208,764 B2* | 6/2012 | Guckenberger | 382/305 |
| 8,213,689 B2* | 7/2012 | Yagnik et al. | 382/118 |
| 8,230,344 B2* | 7/2012 | Abujbara et al. | 715/730 |
| 8,238,667 B2* | 8/2012 | Hosaka et al. | 382/217 |
| 8,255,815 B2* | 8/2012 | Ording | 715/764 |
| 8,295,454 B2* | 10/2012 | Ron et al. | 379/93.23 |
| 8,331,674 B2* | 12/2012 | Feris et al. | 382/181 |
| 8,335,355 B2* | 12/2012 | Costache et al. | 382/118 |
| 8,363,122 B2* | 1/2013 | Onozawa | 348/222.1 |
| 8,375,302 B2* | 2/2013 | Oakley et al. | 715/723 |
| 8,385,606 B2* | 2/2013 | Fukuda et al. | 382/118 |
| 8,385,610 B2* | 2/2013 | Corcoran et al. | 382/118 |
| 8,422,852 B2* | 4/2013 | Suri et al. | 386/239 |
| 8,443,285 B2* | 5/2013 | Bachman et al. | 715/716 |
| 8,452,047 B2* | 5/2013 | Lee et al. | 382/103 |
| 8,457,366 B2* | 6/2013 | Cheswick | 382/118 |
| 2001/0000025 A1* | 3/2001 | Darrell et al. | 382/103 |
| 2001/0041020 A1* | 11/2001 | Shaffer et al. | 382/305 |
| 2002/0118287 A1* | 8/2002 | Grosvenor et al. | 348/222.1 |
| 2003/0002715 A1* | 1/2003 | Kowald | 382/118 |
| 2003/0147465 A1* | 8/2003 | Wu et al. | 375/240.11 |
| 2004/0054542 A1* | 3/2004 | Foote et al. | 704/500 |
| 2004/0151381 A1* | 8/2004 | Porter et al. | 382/218 |
| 2004/0175021 A1* | 9/2004 | Porter et al. | 382/118 |
| 2005/0002647 A1* | 1/2005 | Girgensohn et al. | 386/69 |
| 2005/0084232 A1* | 4/2005 | Herberger et al. | 386/4 |
| 2005/0228849 A1* | 10/2005 | Zhang | 709/200 |
| 2006/0050166 A1* | 3/2006 | Sonoda et al. | 348/333.01 |
| 2006/0061598 A1* | 3/2006 | Mino et al. | 345/629 |
| 2006/0092487 A1* | 5/2006 | Kuwabara et al. | 358/537 |
| 2006/0114327 A1* | 6/2006 | Araya et al. | 348/207.99 |
| 2006/0115185 A1* | 6/2006 | Iida et al. | 382/305 |
| 2006/0115922 A1* | 6/2006 | Araya et al. | 438/61 |
| 2006/0126963 A1* | 6/2006 | Sonoda et al. | 382/276 |
| 2006/0192784 A1* | 8/2006 | Yamaji et al. | 345/473 |
| 2006/0200745 A1* | 9/2006 | Furmanski et al. | 715/500.1 |
| 2006/0251383 A1* | 11/2006 | Vronay et al. | 386/52 |
| 2007/0086648 A1* | 4/2007 | Hayashi | 382/154 |
| 2007/0091203 A1* | 4/2007 | Peker et al. | 348/415.1 |
| 2007/0177805 A1* | 8/2007 | Gallagher | 382/190 |
| 2007/0242861 A1* | 10/2007 | Misawa et al. | 382/118 |
| 2008/0056580 A1* | 3/2008 | Okada et al. | 382/190 |
| 2008/0080743 A1* | 4/2008 | Schneiderman et al. | 382/118 |
| 2008/0127270 A1* | 5/2008 | Shipman et al. | 725/46 |
| 2008/0166027 A1 | 7/2008 | Jeong et al. | |
| 2008/0292181 A1* | 11/2008 | Kasai et al. | 382/159 |
| 2008/0304807 A1* | 12/2008 | Johnson et al. | 386/52 |
| 2008/0304808 A1* | 12/2008 | Newell et al. | 386/52 |
| 2008/0304813 A1* | 12/2008 | Mae et al. | 386/124 |
| 2008/0306995 A1* | 12/2008 | Newell et al. | 707/104.1 |
| 2009/0022472 A1* | 1/2009 | Bronstein et al. | 386/52 |
| 2009/0074304 A1* | 3/2009 | Momosaki | 382/224 |
| 2009/0103887 A1 | 4/2009 | Choi et al. | |
| 2009/0141949 A1* | 6/2009 | Lee et al. | 382/118 |
| 2009/0185723 A1* | 7/2009 | Kurtz et al. | 382/118 |
| 2010/0104145 A1* | 4/2010 | Momosaki | 382/118 |
| 2010/0122286 A1* | 5/2010 | Begeja et al. | 725/34 |
| 2010/0245382 A1* | 9/2010 | Sio | 345/593 |
| 2011/0142370 A1* | 6/2011 | Joshi et al. | 382/307 |
| 2011/0157221 A1* | 6/2011 | Ptucha et al. | 345/629 |
| 2012/0054617 A1* | 3/2012 | Bachman et al. | 715/723 |
| 2012/0114179 A1* | 5/2012 | Okada et al. | 382/103 |
| 2012/0281022 A1* | 11/2012 | Momosaki | 345/660 |

OTHER PUBLICATIONS

Cotsaces, et al., "Video Indexing by Face Occurrence-Based Signatures", Department of Informatics, Aristotle University of Thessaloniki, Thessaloniki 54124, Greece, 2006, 4 pages.

Tsapatsoulis, et al., "Facial Image Indexing in Multimedia Databases", Pattern Analysis & Applications (2001) 4:93-107.

Viallet et al., "Face detection for video summaries", France Telecom Research & Development, Technopole Anticipa, 2, avenue Pierre Marzin, 22307 Lannion, France, 2002, 8 pages.

* cited by examiner

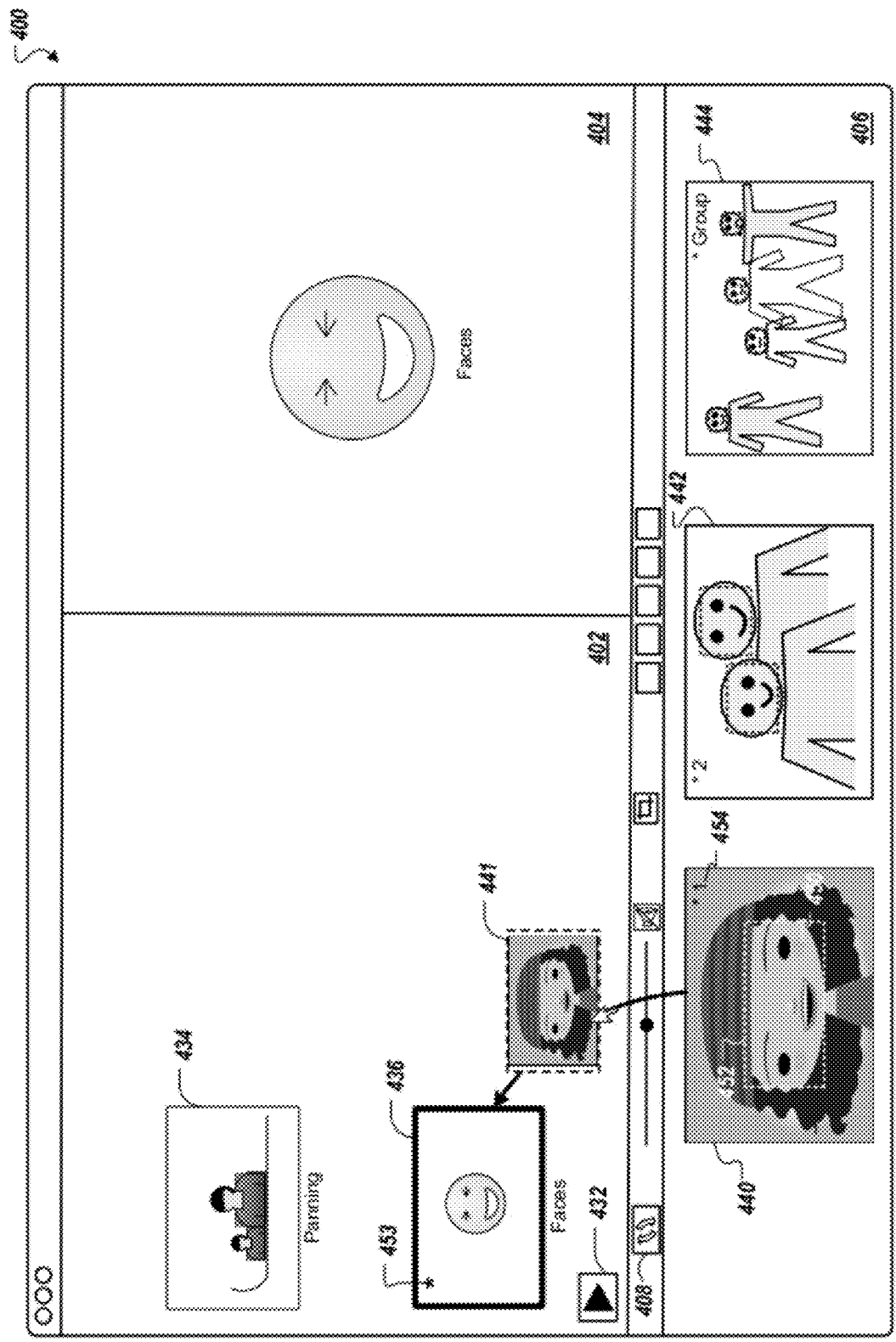

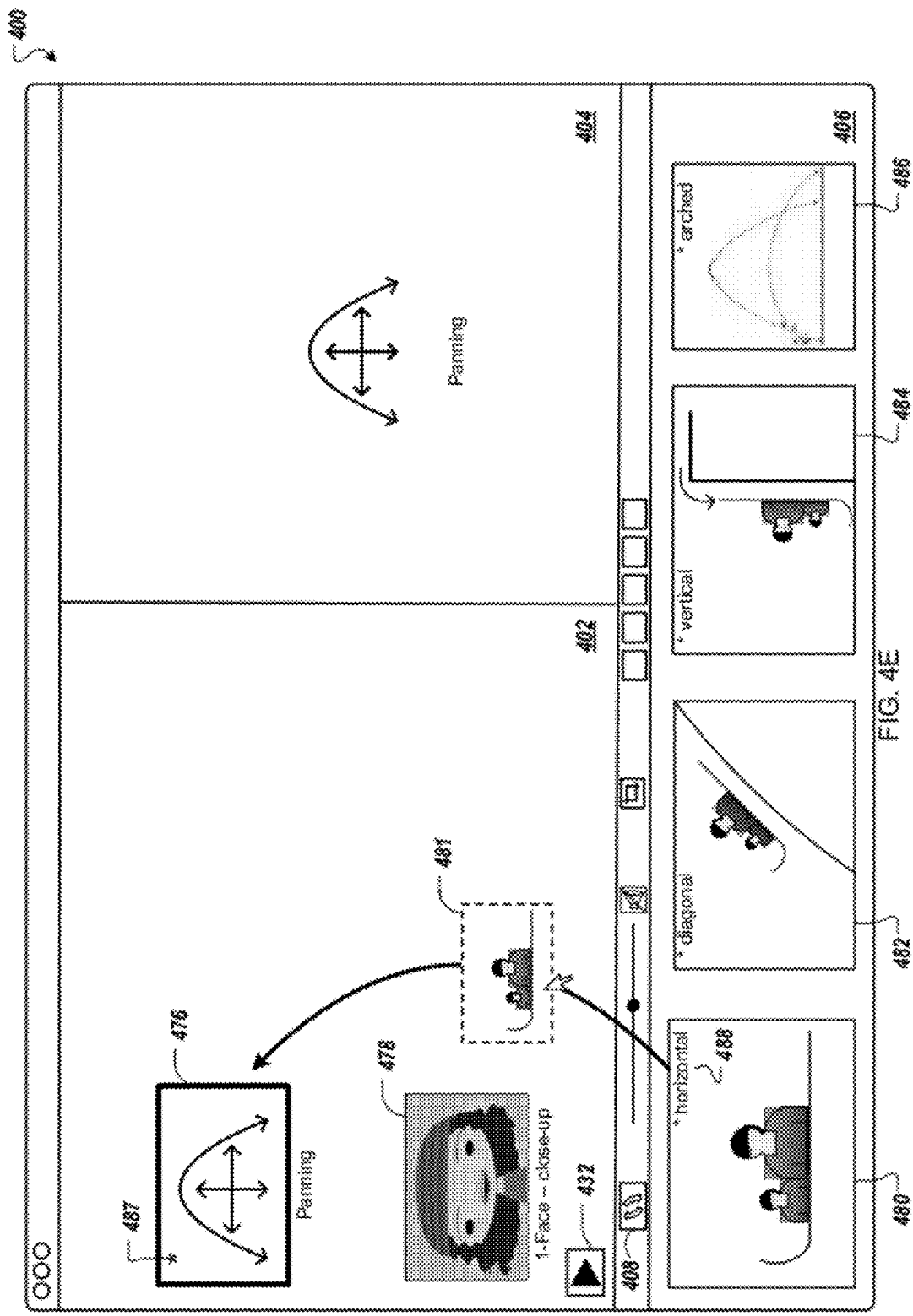

VISUAL PRESENTATION COMPOSITION

CLAIM OF PRIORITY

This application claims priority under 35 USC §119(e) to U.S. Provisional Patent Application Ser. No. 61/394,741, filed on Oct. 19, 2010, the entire contents of which are hereby incorporated by reference.

BACKGROUND

This description relates to systems and techniques that facilitate the composition of visual presentations, for example, movie trailers or complete movies.

Technological advances in the field of consumer digital videography equipment (e.g., digital video cameras having reduced size, increased capacity, increased resolution and/or decreased price) have caused would-be amateur movie makers to capture more video footage than ever before. Editing such voluminous footage into a presentation that is interesting, entertaining and/or informative, however, typically is not a simple task but rather tends to require more skill, experience, effort and/or creativity than most non-professionals can muster. As a result, amateur movie makers often subject family and friends to video presentations of unedited, or poorly edited, video footage that tend to be unduly long, disjointed, confusing and/or just plain boring.

SUMMARY

This specification describes technologies that facilitate the composition of visual presentations, for example, movie trailers or complete movies.

In general, one aspect of the subject matter described in this specification can be implemented in a method that includes analyzing a plurality of video clips, where each video clip includes a plurality of frames, to determine a subset of the plurality of video clips that have at least one frame depicting one or more faces. The method also includes presenting, in a user interface of a video editing application, the determined subset of video clips along with indicia indicating one or more face-related characteristics of each of the subset of video clips. Further, the use includes receiving, from a user of the video editing application, a selection of one or more frames of at least one of the subset of video clips to populate a shot placeholder in a movie-building template, and generating a playable media file representing a movie based at least in part on the selection received from the user.

Implementations can optionally include one or more of the following features. The analyzing can be performed in response to accessing a library of video clips including the plurality of video clips. The analyzing can include detecting the one or more faces in the at least one frame of the subset of the plurality of video clips, and determining a relative amount of frame space occupied by the detected one or more faces. In some implementations, the one or more face-related characteristics indicated by the presented indicia can include quantity of faces detected in the at least one frame of the subset of the plurality of video clips.

In some implementations, the method can also include classifying the subset of the plurality of video clips as a one-face shot when a single face is detected in the at least one frame of the subset of the plurality of video clips; classifying the subset of the plurality of video clips as a two-face shot when two faces are detected in the at least one frame of the subset of the plurality of video clips; and classifying the subset of the plurality of video clips as a group shot when three or more faces are detected in the at least one frame of the subset of the plurality of video clips.

In some implementations, the one or more face-related characteristics indicated by the presented indicia further include information relating to the determined relative amount of frame space occupied by the detected one or more faces. As such, the method can include inscribing the detected one or more faces in respective rectangles. Determining the relative amount of the frame space occupied by the detected one or more faces can include obtaining a ratio of a sum of pixels included in the respective rectangles which inscribe the detected faces and total pixels in a frame. Further, the method can include, (i) when a single face is detected in the at least one frame of the subset of the plurality of video clips, classifying the subset of the plurality of video clips as a close-up one-face shot if the determined relative amount of frame space occupied by the detected single face is larger than or equal to a first predetermined relative amount, a medium one-face shot if the determined relative amount of frame space occupied by the detected single face is less than the first predetermined relative amount and more than or equal to a second predetermined relative amount, and a wide one-face shot if the determined relative amount of frame space occupied by the detected single face is less than the second predetermined relative amount; (ii) when two faces are detected in the at least one frame of the subset of the plurality of video clips, classifying the subset of the plurality of video clips as a close-up two-face shot if the determined relative amount of frame space occupied by the detected two faces is larger than or equal to a third predetermined relative amount, a medium two-face shot if the determined relative amount of frame space occupied by the detected two faces is less than the third predetermined relative amount and more than or equal to a fourth predetermined relative amount, and a wide two-face shot if the determined relative amount of frame space occupied by the detected two faces is less than the fourth predetermined relative amount; and (iii) when a group of three or more faces is detected in the at least one frame of the subset of the plurality of video clips, classifying the subset of the plurality of video clips as a close-up group shot if the determined relative amount of frame space occupied by the detected group of faces is larger than or equal to a fifth predetermined relative amount, a medium group shot if the determined relative amount of frame space occupied by the detected group of faces is less than the fifth predetermined relative amount and more than or equal to a sixth predetermined relative amount, and a wide group shot if the determined relative amount of frame space occupied by the detected group of faces is less than the sixth predetermined relative amount.

In some implementations, the method can also include associating a single indicium with each video clip of the determined subset of the plurality of video clips, the associated single indicium indicating the one or more face-related characteristics of each video clip of the determined subset of video clips. In some implementations, the method can further include associating indicia with respective frames included in each video clip of the determined subset of the plurality of video clips, the associated indicia indicating the one or more face-related characteristics of the respective frames included in each video clip of the determined subset of video clips.

In some implementations, the method can include filtering the determined subset of video clips based on characteristics of the shot placeholder in the movie template to obtain a filtered subset of the determined subset. For example, presenting the determined subset of video clips can include presenting additional indicia along with the filtered subset of the determined subset. As another example, presenting the determined subset of video clips can include presenting only the filtered subset of the determined subset.

Other implementations of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

For example, the disclosed subject matter may be implemented as a software application that enables a user, for example, a home movie enthusiast, to quickly and easily generate a professional looking movie (and/or a movie trailer) by performing a few simple operations such as selecting a desired template, designating portions of video footage (e.g., captured by the user and/or including a user selected one, two or a group of people, and/or being of a user selected close-up, medium or wide angle type) to be used in the movie, and filling in some basic information (e.g., who, what, where) about the designated video footage portions and their respective contents. In addition, even prior to video footage capture or designation, a movie template may provide the user with guidance about the types and quantity of video segments that ideally should be captured and used to populate the template, thereby improving the quality of the resulting movie. The described subject matter also may enable a user to easily and quickly generate a high quality summary or synopsis of a larger video presentation (e.g., make a movie trailer that provides a compelling and brief synopsis of a longer movie) while minimizing the level of knowledge, experience, effort and/or creativity typically required to do so.

Details of one or more implementations are set forth in the accompanying drawings and the description below. Other features and potential advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
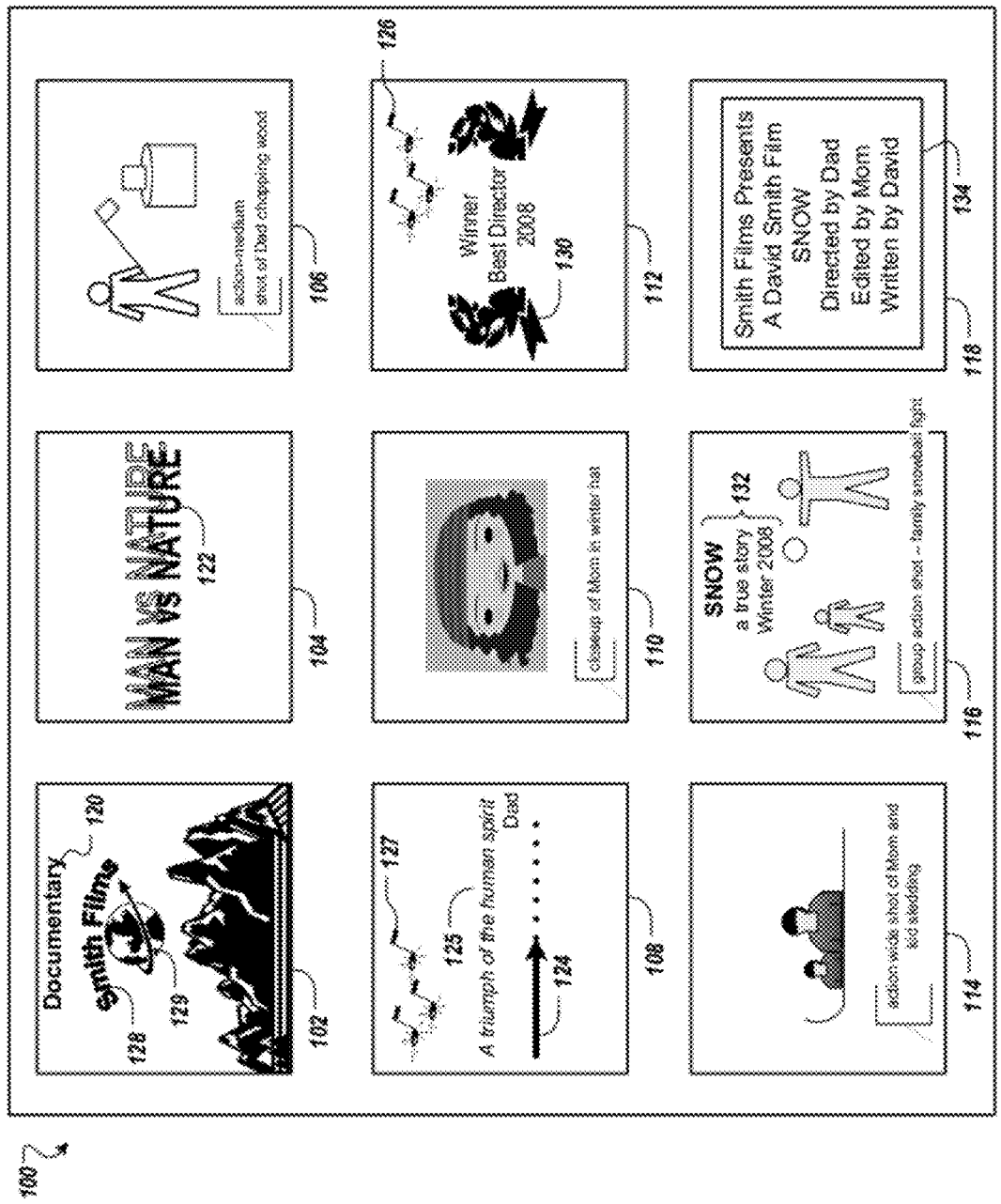
FIG. 1 shows example video clips of a generated movie.

FIG. 1 shows example video clips 102-118 displayed in sequence as content of movie 100 generated for a user in response to a user's selection and customization of a movie template. As described in more detail below, a user can customize a movie template by selecting one or more video clips to fill in one or more shot placeholders, by customizing text such as titles and subtitles, and by customizing other movie features, such as awards, credits, and studio logos, to name a few examples.

A movie template can have a corresponding theme. For example, the movie template for the movie 100 has a documentary theme, as indicated by title 120 displayed in the video clip 102. Other themes can include, for example, action adventure, blockbuster, documentary, "buddy", "chick flick", travel, epic drama, "film noir", goth, holiday, friendship, spy, pet, romantic comedy, speed, sports drama, western, horror, children's, romantic love story, super natural, and coming of age.

A movie template for a particular theme can indicate, for example, a fixed or variable cast member list. For example, a movie template with a romantic comedy theme can specify a fixed cast of two cast members and a movie template with an adventure theme can specify a variable cast of one to six cast members.

A movie template of a particular theme can also define a sequence of shot placeholders indicating an order of shots and types of shots to be selected by a user. Each shot placeholder can include graphical indicia representing one or more desirable characteristics specific to that shot placeholder. A user can select, using a user interface, one or more video clips which correspond to desirable characteristics indicated by the shot placeholders. For example, a user can select a wide scenery video clip such as shown in the video clip 102, an "action-medium" video clip such as the video clip 106, a close-up of a particular cast member such as the close-up of "Mom" shown in video clip 110, an "action-wide" video clip such as the video clip 114, or a group-action video clip such as the video clip 116.

In addition to shot order and shot type, a movie template can have other predefined specifications, such a video segment length corresponding to each shot, background music, text titles and subtitles, transitions between video clips, voiceovers and other effects. For example, background music and video clip transition can be selected for each theme. A movie template with a documentary theme, for example, can have milder music and longer video segments than, for example, a movie template with an action adventure theme.

As another example, a movie template can have text that can be customized, and the text can be shown with various effects, such as animated text 122 (e.g., the animated text 122 can flash, can grow from smaller to larger or from larger to smaller, "bounce around", etc.). As another example, graphic 124 can be animated as the video clip 108 is shown (e.g., the graphic 124 can include a horizontal line which appears to grow in size as it horizontally extends from left to right across the screen underneath quote 125). Effects used with text, graphics, and/or video can include slow motion, zoom-in, fade-to-black, or other NLE (Non-Linear Editing) effects, to name a few examples.

A movie template can include pre-defined background music that can be timed to the playing and transition of user-selected video clips. For example, the movie template used to create the movie 100 can be configured so that background music 126 plays while the video clip 112 is played and background music 127 is played while the video clip 108 is played. A user can configure a video clip so that user audio recorded during the recording of the video clip is played during the playing of the video clip in the movie 100. In some instances, the user can configure a video clip so that user audio recorded during the recording of the video clip is played in parallel with background music during the playing of the video clip in the movie 100.

A movie template can allow a user to specify a studio name and studio logo. The studio name and studio logo can be shown in a video clip of a generated movie, such as studio name 128 and studio logo 129 illustrated in the video clip 102. A movie template can allow a user to specify one or more movie awards. For example, the video clip 112 illustrates a "best director" award. A movie template can allow the user to simply enter the text title of the award, and a graphical representation of the award, which can include one or more graphics such as graphic 130, can be automatically displayed in a video segment of the generated movie (e.g., as illustrated in video clip 112).

In some implementations, user-specified text can be combined with user-selected video clips. For example, the title 120, studio name 128, and studio logo 129 can be displayed overlaid on wide-scenery video in the video clip 102. As another example, text 132 including a user-specified movie title, subtitle, season, and year can be concatenated and overlaid on group-action video displayed in the video clip 116. In some implementations, some video segments can include text (e.g., titles, subtitles) without including other video content.

The movie 100 can include a credits screen (e.g., as a last video clip), such as credits 134 illustrated in video clip 118. The credits 134 can be formatted to appear similar to credits shown in production movies (e.g., as better shown in FIG. 2). The credits 134 can include the name of a user-specified studio (e.g., the studio name 128), and can include the names of one or more user-specified cast members (e.g., "Mom", "Dad", "David Smith").

Figure 2:
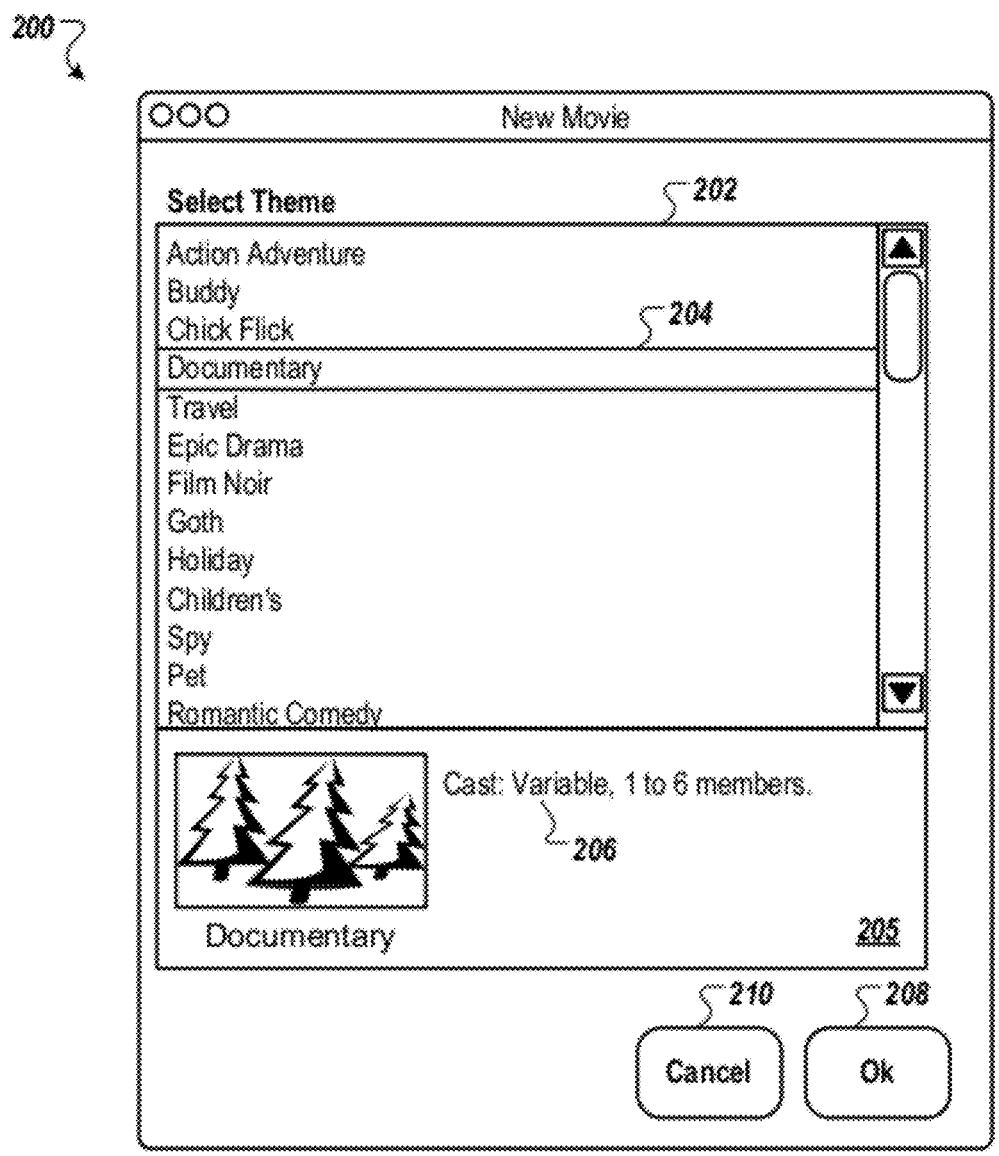
FIG. 2 is an example graphical user interface for selecting a movie template.

FIG. 2 is an example graphical user interface (GUI) 200 for creating a movie template having a particular theme. The user may select a particular theme using theme selection control 202. For example, a documentary theme can be selected, as indicated by selected item 204. Information describing the selected theme can be displayed in area 205. For example, cast information 206 can indicate that a documentary themed movie can include from one to six cast members. A user can create a movie template of the selected theme by selecting control 208. The user can cancel out of the GUI 200 without creating a movie template by selecting control 210.

Figure 3:
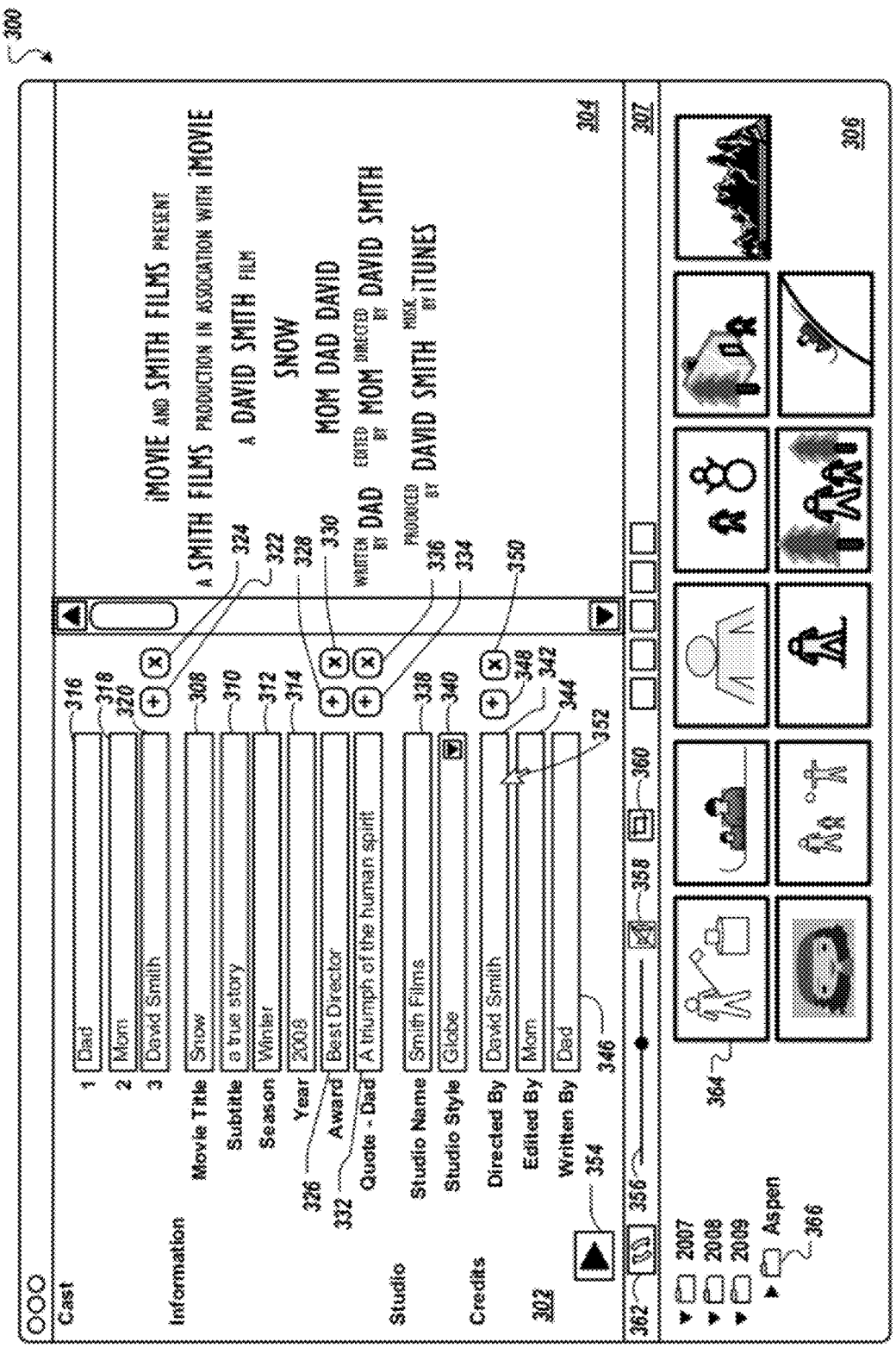
FIGS. 3-5 are examples of graphical user interfaces for customizing a movie template.

FIG. 3 is an example graphical user interface 300 for customizing a movie template. The GUI 300 includes a form area 302, a preview area 304, a user video clips area 306, and one or more control bar areas 307. The user can use the form area 302 to customize movie information. For example, a movie title and subtitle can be configured using controls 308 and 310, respectively. As another example, the season and year of the movie can be configured using controls 312 and 314, respectively. Movie title, subtitle, season, and year information can be displayed in one or more video clips of a movie generated from the movie template (e.g., as shown in the video clip 116 described above with respect to FIG. 1).

A movie can include one or more cast members. As mentioned above, movie templates for some types of themes can include a fixed number of cast members (e.g., a romantic comedy movie can include a fixed cast of two) and movie templates for other types of themes can include a variable number of cast members. A user can enter names of one or more cast members using controls 316-320. Cast member names can be displayed in one or more video clips of the generated movie, such as with one or more quotes, in a credits screen, in an awards screen, or in another video clip. A user can add or delete a cast member using controls 322 and 324, respectively.

A user can customize one or more awards for a movie. A user can enter one or more award names, such as by using control 326. Awards can include, for example, "best director", "movie of the year", "best actor", or another user-selected name. A generated movie can include an awards video clip, where the award name is displayed, possibly along with one or more graphics (e.g., as shown in video clip 112 described above with respect to FIG. 1). A user can add or delete an award using controls 328 and 330, respectively.

A user can customize one or more quotes for a movie. A user can enter the text for a quote, such as by using control 332. The user can also select control 332 to select a cast member to attribute the quote to (e.g., the quote entered in control 332 is currently attributed to "Dad"). A quote can be displayed in a video clip for a movie, such as overlaid on top of video footage, or along with a non-animated or animated graphic (e.g., as shown in video clip 108 described above with respect to FIG. 1). A user can add or delete a quote using controls 334 and 336, respectively.

A user can customize a studio name and studio logo, such as by using controls 338 and 340, respectively. The user can select a studio logo style from a list of predefined studio logo styles using the control 340. In some implementations, the list of studio logo styles includes parodies of existing movie studios. In some implementations, the user is prevented from entering the name of several popular existing movie studios. A user-entered studio name and a studio logo based on the selected studio style can be displayed in one or more video clips of the generated movie (e.g., as shown in video clip 102 and video clip 118 described above with respect to FIG. 1).

A user can customize one or more credits for a movie. For example, a user can use controls 342-344 to configure a director, editor, and writer, respectively. A user can select a cast member for a credited role or can enter in a different name. In some implementations, a cast member can be automatically assigned to a credited role. In some implementations, a user can override an automatically assigned credited role by entering a new value for the credited role. A user can add or remove a credit by using controls 348 and 350, respectively. In some implementations, to add a credit, a user selects from a predefined list of credits (e.g., directed-by, edited-by, written-by, produced-by). In other implementations, a user can enter in the name of a custom credit.

Credits may be displayed in a generated movie in a credits screen, such as shown in the video clip 118 described above with respect to FIG. 1. A credits screen can also be displayed in the preview area 304. The preview area 304 can show preview content associated with areas of the form area 302. For example, if a user moves mouse pointer 352 over one of the credit controls 342-346, a preview of a generated credits screen can be displayed in the preview area 304 (e.g., as illustrated in FIG. 3). The preview area 304 can also be used to view a preview of the generated movie. For example, the user can select play control 354 to view, in the preview area 304, a preview of a movie generated from the movie template (e.g., the video clips 102-118 described above with respect to FIG. 1 can be displayed in the preview area 304).

Other customization of movie information is possible, and customizations can vary based on the theme of the movie template. For example, a movie template having a pet theme can allow a user to select a pet type (e.g., cat, bird, dog, horse). A generated movie can include a video clip with an animated graphic of pet paw/footprints (e.g., dog paw prints, cat paw prints, or bird footprints, according to a user's template customization) "walking across the screen". As another example, movie templates of some themes can allow a user to customize a movie rating (e.g., general (G), parental-guidance (PG, PG-13), restricted (R)).

The control area 307 can include a set of controls for controlling the GUI 300. For example, the control area 307 can include, among other controls, a control 356 for adjusting playback volume, a control 358 for muting playback volume, a control 360 for selecting a portion of a user-selected video clip to use for a corresponding video segment in a generated movie, and a control 362 for switching between a view which includes the form area 302 and a view which includes a shot placeholder area.

As described in more detail below, a user can select a video clip from the video clips area 306 to fill in a shot placeholder. The video clips area 306 includes available user video clips, such as a video clip 364. The user can organize video clips using one or more folders. For example, the video clips displayed in the video clips area 306 can be video clips included in a folder 366.

Figure 4:
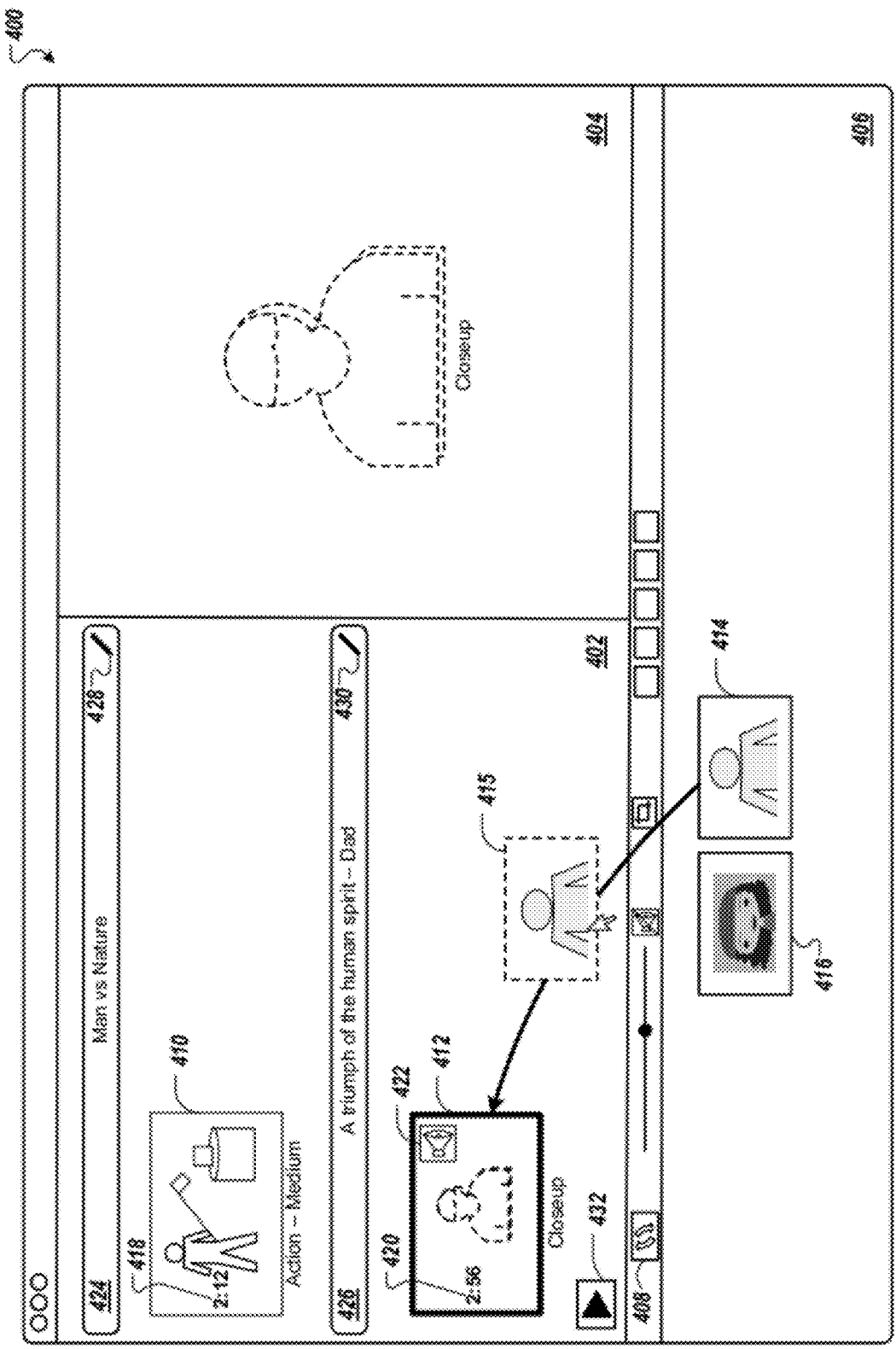

FIG. 4 is another example graphical user interface 400 for customizing a movie template. The GUI 400 includes shot placeholder area 402, preview area 404, and user video clips area 406. The user can toggle between the shot placeholder area 402 and the form area 302 described above with respect to FIG. 3, for example by selecting control 408.

The shot placeholder area 402 displays one or more shot placeholders which represent an order and type of video content to be included in the generated movie, according to the theme of the movie template. A shot placeholder that has been "filled-in" can appear differently than a shot placeholder that has not been filled in. For example, the contents of shot placeholder 410 (which represents a filled-in shot placeholder, such as filled in using the video clip 364 described above with respect to FIG. 3) appears in a solid line and the contents of shot placeholder 412 (which has not been filled in) appears in a dashed-line. The user can fill in a shot placeholder by selecting a video clip from the video clips area 406. For example, a user can select video clip 414 and can "drag and drop" a representation 415 of the video clip 414 onto the shot placeholder 412.

The video clips area 406 can be filtered to display shots which have characteristics which correspond to a selected shot placeholder. For example, selected shot placeholder 412 corresponds to a close-up shot of one cast member. Face detection optionally followed by face recognition of the detected faces can be performed on user video clips, and video clips having a certain quantity of faces associated with people or other actors (e.g., one, two, three or more) can be identified, as described below in connection with FIG. 4B. In each video clip, the size of one or more faces relative to the size of the video clip frame can be determined, to identify a shot type (e.g., close-up, medium, wide). The video clips displayed in the video clips area 406 can be filtered to show user video clips which include the number of people and shot type associated with the selected shot placeholder. For example, the video clip area 406 includes the video clip 414 and video clip 416, which are both close-up shots of one person. Video clip classification based on a quantity of faces detected in portions of video and optionally further based on whether the detected faces are part of close-up, medium or wide angle shots is provided below in connection with FIGS. 4B-4D.

A shot placeholder can indicate a video segment length. For example, the shot placeholder 410 includes a time indicator 418 that indicates that the shot placeholder 410 corresponds to a video segment of two seconds and twelve milliseconds. Similarly, time indicator 420 indicates that the shot placeholder 412 corresponds to a video segment of two seconds and fifty six milliseconds. The time for each shot placeholder can be defined in the movie template. As mentioned above, a movie template can include timing of features such as background music, video clip transition, and effects. As described in more detail below, if a user video clip selected for a shot placeholder is longer in duration than the time specified for the shot placeholder, the user can customize the portion of the user video clip used in the generated movie.

Recorded audio of a user video clip can be muted by default in a generated movie. A shot placeholder can include a control to override the default muting of user audio. For example, a user can select control 422 to turn on audio playback of user audio associated with a user video clip selected for the shot placeholder 412.

The shot placeholder area 402 can display text items such as quotes, titles, and subtitles, and can position the text items in an order among shot placeholders corresponding to the order that the associated shots and text will appear in the generated movie. For example, a text area 424 corresponding to a movie title is displayed above the shot placeholder 410, indicating that the associated movie title will be displayed before the video clip associated with the shot placeholder 410. As another example, a text area 426 associated with a quote is included in the shot placeholder area 402 below the shot placeholder 410 and above the shot placeholder 412.

A user can edit text associated with a text area. For example, to edit the movie title associated with the text area 424, the user can select the text area 424 (e.g., by selecting the text or by selecting edit control 428). Similarly, the user can edit the quote associated with the text area 426 by selecting the text area 426 or by selecting edit control 430. Once the user has selected the text area 426, the user can select a different cast member for quote attribution.

The preview area 404 can be used to preview a video clip associated with a shot placeholder. For example, the user can select a shot placeholder (e.g., shot placeholder 410) and can select control 432. If the user selects the control 432 while a shot placeholder which has not been filled in (e.g., shot placeholder 412) is selected, an animation can be shown in the preview area 404, where the animation can be based on the shot type of the shot placeholder. For example, if the selected shot placeholder has a shot type of action, an animated character can be displayed in the preview area 404 (e.g., to emphasize a notion of action). As another example, if the selected shot placeholder has a shot type of close-up, a non-animated character can be displayed in the preview area 404. In some implementations, a user can scroll with a mouse in order to preview a title and content for a video clip.

FIG. 4B shows another instance of the example graphical user interface (GUI) 400 for customizing the movie template. As described above, the GUI 400 includes shot placeholder area 402, preview area 404, and user video clips area 406. In this example, the shot placeholder area 402 includes a shot placeholder 434 corresponding to keyword "Panning" which has been "filled-in" using the video clip 114 described above with respect to FIG. 1. A process for detecting camera panning and for classifying ranges of video clips based on the detected camera panning can be applied to video clips imported into a movie editing application associated with GUI 400 as disclosed below in connection with FIGS. 4E and 4F.

Also in this example, the shot placeholder area 402 includes another shot placeholder 436 which has not been filled-in. The keyword "Faces" corresponds to the other shot placeholder 436. As described above in connection with FIG. 4, an unfilled shot placeholder can contain a generic image representative of the corresponding keyword. In the example illustrated in FIG. 4B, the unfilled shot placeholder 436 associated with the keyword "Faces" contains a generic representation of a face. Upon user selection of the "Faces" shot placeholder 436, video clips displayed in the user video clip area 406 can be filtered to display shots which depict one or more faces. For example, the video clip area 406 includes the video clip 440 that depicts one face 450, video clip 442 that depicts two faces and video clip 444 that depicts a group of four faces. Moreover, a user can select video clip 440, for example, and can "drag and drop" a representation 441 of the video clip 440 onto the shot placeholder 436. As described above in connection with FIG. 4, the preview area 404 can be used to preview a video clip associated with a selected shot placeholder. For example, an animated or non-animated face representation can be shown in the preview area 404, in response to selection by the user of the un-filled "Faces" shot placeholder 436. After the "Faces" shot placeholder 436 has been filled by the user, the content of the video clip that occupies the "Faces" shot placeholder 436 can be played in the preview area 404 upon selection of control 432.

A plurality of video clips, each video clip including a plurality of frames, can be analyzed to determine a subset of the plurality of video clips that have at least one frame depicting one or more faces. The analysis can be performed automatically, for example, upon uploading the video clips to a movie or video library. In this fashion, one or more of facial detection algorithms that are known in the art, such as the Viola Jones, Rowley Baluja Kanade, or Schneiderman Kanade algorithms, can be applied to the videos stored in the movie or media library. In some implementations, a video editing application associated with the GUI 400 can perform the one or more face detection algorithms on every other $N^{th}$ frame of a video clip. For example, N=10. In some implementations, the video editing application associated with GUI 400 can perform the one or more face detection algorithms on every frame of a video clip.

The analysis further includes determining a quantity of faces in frames of the video clips. A number representing the detected faces per video clip corresponds to a first hierarchical sublevel of the video clip classification based on the keyword "Faces". For example, a video clip 440 determined to depict one face 450 can be classified as a "1-Face" shot and can be presented to a user along with a tag 454 which includes character "1". Similarly, a video clip 442 determined to depict two faces can be classified as a "2-Faces" shot and can be presented to the user along with a tag which includes character "2". Finally, video clips determined to depict three or more faces can be classified as a "Group" shot and can be presented to the user along with a tag which reads "Group".

For example, analysis of a given number of consecutive frames representing a temporal range of a video clip may lead to detection of two faces in most of the analyzed frames. In some implementations corresponding to frame-level classification based on the keyword "Faces", each of the analyzed frames can be classified based on the quantity of faces detected per analyzed frame. In the foregoing example, when two faces are detected in most of the given number of frames of the video clip range, each of the analyzed frames determined to depict two faces can be tagged as a frame that depicts two faces. In some implementations corresponding to range-level classification based on the keyword "Faces", the range of the video clip including the analyzed frames can be classified based on the quantity of faces detected in the analyzed range of the video clip. In the foregoing example, when two faces are detected in most of the given number of frames of the video clip range, the entire video clip range can be tagged as a video clip range which depicts two faces.

In some implementations, a face detected in a frame of a video clip in accordance with one or more of the above facial detection algorithms enumerated above can be presented in the GUI 400 along with a rectangle that inscribes the detected face. For example, the face 450 detected in the video clip 440 is inscribed in and is displayed along with a rectangle 452. The rectangle 452 is represented by dotted-line. Similarly, the two faces detected in movie clip 442 and the four faces detected in movie clip 444 are also inscribed in respective rectangles.

To simplify management of the classified ranges of the plurality of video clips in the video or image library, when a temporal range of a video clip that contains detected faces is shorter than a predetermined time interval (e.g., 1 second,) the video editing application associated with the GUI 400 is configured to skip classifying the range based on the keyword "Faces" (i.e., the forgoing range may not be tagged to indicate presence of faces.) Further, when a temporal range of a video clip shorter than a predetermined time interval (e.g., 1 second) contains no detected faces and the range is temporally located between two ranges of the video clip tagged to indicate the presence of faces, the video editing application associated with the GUI 400 is configured to tag the in-between range as depicting the faces corresponding to the before and after ranges. For example, a first range of a video clip is tagged as depicting two faces, a second range of the video clip, immediately following the first range and having 0.7 seconds duration, is untagged (because the analysis failed to detect faces in the second range,) and a third range of the video clip immediately following the second range, is tagged as depicting two faces. In this example, the second range can also be marked as depicting two faces, and then, the first, second and third ranges can be consolidated into one contiguous range of the video clip that is classified as depicting two faces.

In some implementations, the "Faces" shot placeholder 436 can have a control 453 for transitioning to one of the available shot placeholders "1-Face", "2-Faces" and "Group" corresponding to the first hierarchical sublevel of the video clip classification based on the keyword "Faces". For example, instead of the user performing a "drag and drop" of the representation 441 of the video clip 440 onto the shot placeholder 436, the user can instruct GUI 400 through the control 453 to replace the "Faces" shot placeholder 436 with the "2-Faces" shot place holder 456, as described below in connection with FIG. 4C.

Figure 4C:
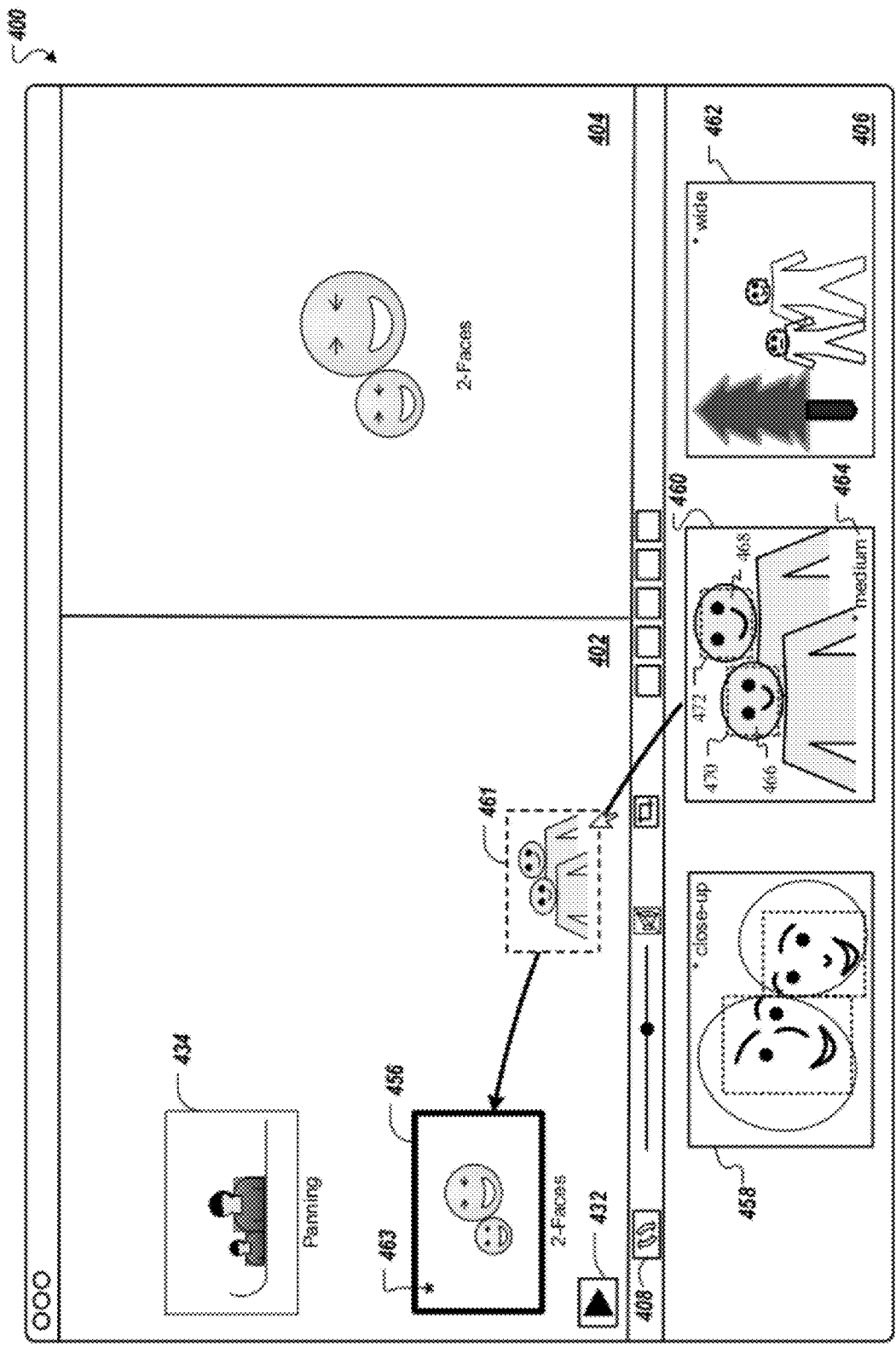

FIG. 4C shows another instance of the example graphical user interface 400 for customizing the movie template. The shot placeholder area 402 includes a shot placeholder 456 which has not been filled-in and corresponds to the keyword "2-Faces." In the example illustrated in FIG. 4C, the unfilled shot placeholder 456 associated with the keyword "2-Faces" contains a generic representation of two faces. Upon user selection of the "2-Faces" shot placeholder 456, video clips displayed in the user video clip area 406 can be filtered to display shots which depict two faces. For example, the video clip area 406 includes the video clip 458 that depicts a close-up shot of two faces, video clip 460 that depicts a medium shot of two faces 466 and 468, and video clip 462 that depicts a wide shot of two faces. The filtered video clips can be presented to the user along with tags corresponding to the respective shot types. For example, the tag 464 of video clip 460 includes the word "medium" corresponding to the classification of video clip 460 as a medium 2-face shot.

Moreover, a user can select video clip 460, for example, and can "drag and drop" a representation 461 of the video clip 460 onto the shot placeholder 456. As described above in connection with FIGS. 4 and 4B, the preview area 404 can be used to preview a video clip associated with a selected shot placeholder. For example, an animated or non-animated representation of two faces can be shown in the preview area 404, in response to selection by the user of the un-filled "2-Faces" shot placeholder 456. After the "2-Faces" shot placeholder 456 has been filled by the user, the content of the video clip that occupies the "2-Faces" shot placeholder 456 can be played in the preview area 404 upon selection of control 432.

The analysis described above in connection with FIG. 4B includes detecting faces in the plurality of video clips in the video library and classifying video clip ranges to indicate the presence of one, two or a group of faces. Further, a relative amount of frame space occupied by the detected faces can be determined as part of the video clip analysis to identify a shot type (e.g., close-up, medium, wide). As described in detail below, establishing fractional intervals corresponding to the close-up, medium and wide shot types can be based on the quantity of detected faces per frame. Accordingly, a type of shot identified in the forgoing manner corresponds to a second hierarchical sublevel of the video clip classification based on the keyword "Faces", below the first hierarchical sublevel of the video clip classification based on the keyword "Faces" that corresponds to the quantity of detected faces per video clip (and is described above in connection with FIG. 4B).

The analysis for identifying the shot type includes inscribing the detected faces in respective rectangles. For example, the analysis described above in connection with FIG. 4B can be applied to video clip 460 and can result in detection of faces 466 and 468. Rectangles 470 and 472 can be generated to inscribe the detected faces 466 and 468, respectively. A pixel count C(470) corresponds to the rectangle 470 and a pixel count C(472) corresponds to the rectangle 472. The total pixel count for a frame of video clip 460 can be expressed as C(frame). The fraction "x" of the frame occupied by the detected faces can be determined in the following manner:

$$x = \frac{C(\text{faces})}{C(\text{frame})} = \frac{C(470) + C(472)}{C(\text{frame})}, \quad (1)$$

where C(faces) represents a pixel count of the detected faces contained in the frame. In EQ. 1, the pixel count C(faces) corresponds to the sum of the pixel counts of rectangles 470 and 472.

When a video clip contains one detected face, the video clip can be classified as a close-up 1-face shot if the determined relative amount of frame space occupied by the detected single face "x" is larger than or equal to a first predetermined relative amount. Further when the video clip contains one detected face, the video clip can be classified as a medium 1-face shot if the determined relative amount of frame space occupied by the detected single face "x" is less than the first predetermined relative amount and more than or equal to a second predetermined relative amount. Also when the video clip contains one detected face, the video clip can be classified as a wide 1-face shot if the determined relative amount of frame space occupied by the detected single face "x" is less than the second predetermined relative amount. For example, the first predetermined relative amount can be about 30% and the second predetermined relative amount can be about 17% for 1-face shots.

When a video clip contains two detected faces, the video clip can be classified as a close-up 2-faces shot if the determined relative amount of frame space occupied by the detected single face "x" is larger than or equal to a third predetermined relative amount. Further when the video clip contains two detected faces, the video clip can be classified as a medium 2-faces shot if the determined relative amount of frame space occupied by the detected two faces "x" is less than the third predetermined relative amount and more than or equal to a fourth predetermined relative amount. Also when the video clip contains two detected faces, the video clip can be classified as a wide 2-faces shot if the determined relative amount of frame space occupied by the detected two faces "x" is less than the fourth predetermined relative amount. For example, the third predetermined relative amount can be about 40% and the fourth predetermined relative amount can be about 27% for 2-faces shots.

For instance, the pixel count for the rectangles that inscribe the two faces detected in video clip 458 corresponds to a fraction "x" that satisfies 40≤x, and consequently, the video clip 458 can be classified as a close-up 2-faces shot. Additionally, the pixel count for the rectangles 470 and 472, which inscribe the respective faces 466 and 468 detected in video clip 460, corresponds to a fraction "x" that satisfies 27≤x<40, and consequently, the video clip 460 can be classified as a medium 2-faces shot. Further, the pixel count for the rectangles that inscribe the two faces detected in video clip 462 corresponds to a fraction "x" that satisfies x<27, and consequently, the video clip 458 can be classified as a wide 2-faces shot.

When a video clip contains a group of three or more detected faces, the video clip can be classified as a close-up group shot if the determined relative amount of frame space occupied by the detected group of faces "x" is larger than or equal to a fifth predetermined relative amount. Further when the video clip contains a group of detected faces, the video clip can be classified as a medium group shot if the determined relative amount of frame space occupied by the detected group of faces "x" is less than the fifth predetermined relative amount and more than or equal to a sixth predetermined relative amount. Also when the video clip contains a group of detected faces, the video clip can be classified as a wide group shot if the determined relative amount of frame space occupied by the detected group of faces "x" is less than the sixth predetermined relative amount. For example, the fifth predetermined relative amount can be about 50% and the sixth predetermined relative amount can be about 37% for group shots.

In some implementations, the "2-Faces" shot placeholder 456 can have a control 463 for transitioning to one of the available shot placeholders "2-Faces—close-up", "2-Faces—medium" and "2-Faces—Group" corresponding to the second hierarchical sublevel of the video clip classification based on the keyword "Faces." Equivalently, the classification hierarchy for the "Faces" keyword is two sublevels deep: Faces→QUANTITY OF FACES→TYPE OF ANGLE SHOT. The level QUANTITY OF FACES includes 1-Face, 2-Faces, Group categories; the level TYPE OF ANGLE SHOT includes close-up, medium and wide categories. For example, instead of the user performing a "drag and drop" of the representation 461 of the video clip 460 onto the shot placeholder 456, the user can instruct GUI 400 through the control 463 to replace the "2-Faces" shot placeholder 456 with the "2-Faces—close-up" shot place holder 474, as described below in connection with FIG. 4D.

Figure 4D:
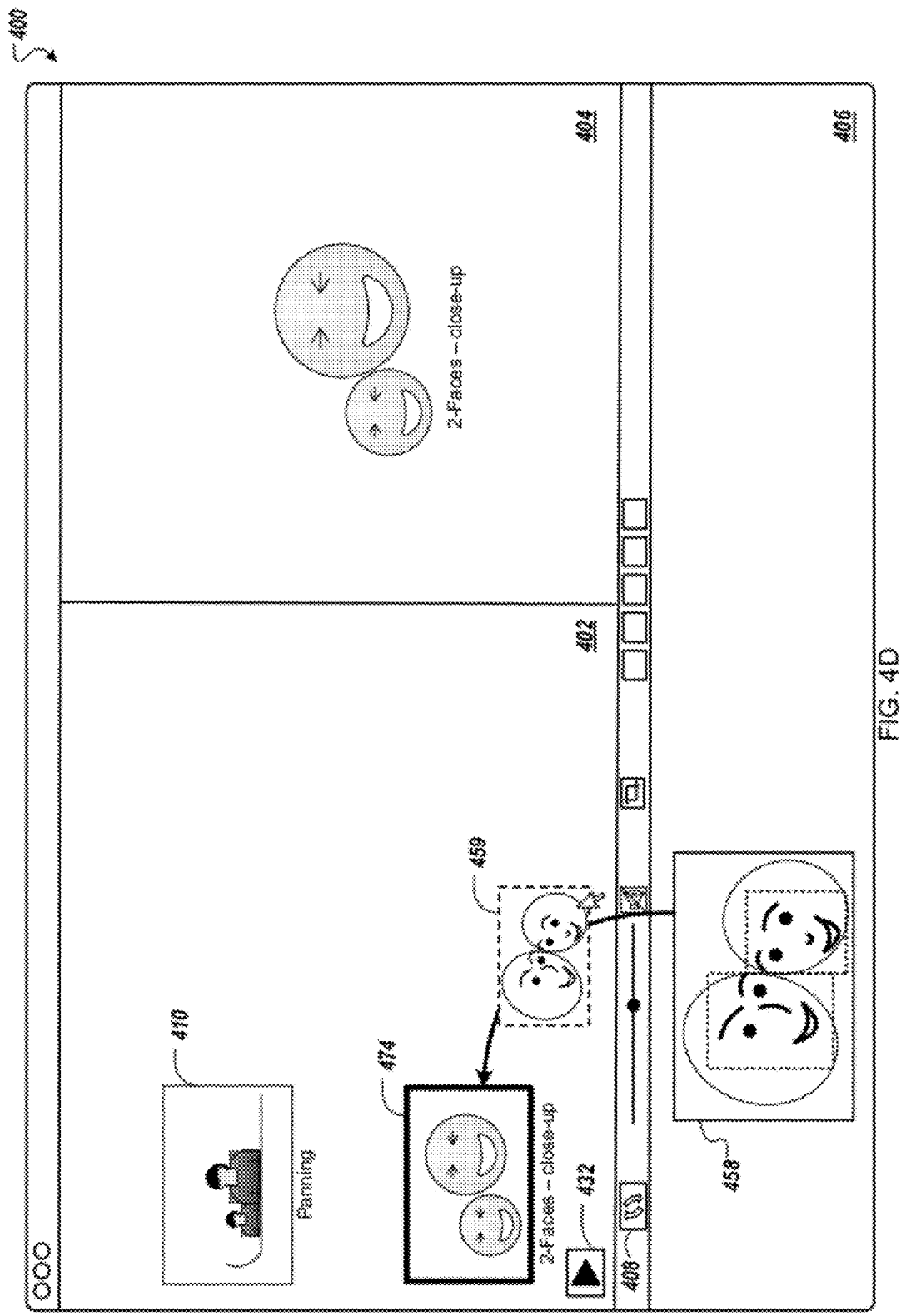

FIG. 4D shows another instance of the example graphical user interface 400 for customizing the movie template. The shot placeholder area 402 includes a shot placeholder 474 which has not been filled-in and corresponds to the keyword "2-Faces—close-up." In the example illustrated in FIG. 4D, the unfilled shot placeholder 474 associated with the keyword "2-Faces—close-up" contains a generic representation of a close-up of two faces. Upon user selection of the "2-Faces—close-up" shot placeholder 474, video clips displayed in the user video clip area 406 can be filtered to display shots which depict close-up shots of two faces. For example, the video clip area 406 includes the video clip 458 that depicts a close-up shot of two faces. Note that, the "2-Faces—close-up" shot placeholder 474 is not configured with a control structure for transitioning to hierarchical sublevels, as such hierarchical sublevels to not exist in this implementation of the hierarchy Faces→QUANTITY OF FACES→TYPE OF ANGLE SHOT described above.

Moreover, a user can select video clip 458, for example, and can "drag and drop" a representation 459 of the video clip 458 onto the shot placeholder 474. As described above in connection with FIGS. 4, 4B and 4C, the preview area 404 can be used to preview a video clip associated with a selected shot placeholder. For example, an animated or non-animated representation of a close-up of two faces can be shown in the preview area 404, in response to selection by the user of the un-filled "2-Faces—close-up" shot placeholder 474. After the "2-Faces—close-up" shot placeholder 474 has been filled by the user, the content of the video clip that occupies the "2-Faces—close-up" shot placeholder 474 can be played in the preview area 404 upon selection of control 432.

FIG. 4E shows another instance of the example graphical user interface 400 for customizing the movie template. As described above, the GUI 400 includes shot placeholder area 402, preview area 404, and user video clips area 406. In this example, the shot placeholder area 402 includes a shot placeholder 478 corresponding to the keyword "1-Face—close-up" which has been "filled-in" using the video clip 110 described above with respect to FIG. 1. A process for detecting faces in video clips and for classifying ranges of video clips based on the quantity of detected faces (e.g., 1, 2, group of 3 or more faces) and the type of angle shot (e.g., close-up, medium, wide) can be applied to video clips imported into a movie editing application associated with GUI 400 as described in detail above in connection with FIGS. 4B-4D.

Additionally in this example, the shot placeholder area 402 includes a shot placeholder 476 which has not been filled-in. The keyword "Panning" corresponds to the unfilled shot placeholder 476. As described above in connection with FIG. 4, an unfilled shot placeholder can contain a generic image representative of the corresponding keyword. In the example illustrated in FIG. 4B, the unfilled shot placeholder 476 associated with the keyword "Panning" contains generic representations of horizontal, vertical and arched camera pans. Upon user selection of the "Panning" shot placeholder 476, video clips displayed in the user video clip area 406 can be filtered to display shots which include camera pans. For example, the video clip area 406 includes the video clip 480 that contains a horizontal pan, video clip 482 that contains a diagonal pan, video clip 484 that contains a vertical pan and video clip 486 that contains an arched pan. Moreover, a user can select video clip 480, for example, and can "drag and drop" a representation 481 of the video clip 480 onto the shot placeholder 476, for instance. As described above in connection with FIG. 4 the preview area 404 can be used to preview a video clip associated with a selected shot placeholder. For example, an animated representation can be shown in the preview area 404, in response to selection by the user of the un-filled "Panning" shot placeholder 476, to emphasize a notion of camera panning. After the "Panning" shot placeholder 476 has been filled by the user, the content of the video clip that occupies the "Panning" shot placeholder 476 can be played in the preview area 404 upon selection of control 432.

A process for detecting camera panning and for classifying ranges of video based on the detected camera pans can be applied to video clips accessed by a movie editing application associated with GUI 400. This process can be performed automatically, for example, upon uploading the video clips to a movie or video library. A camera-panning detector of the video editing application associated with the GUI 400 can be configured to track a global velocity vector for the video clip. Such tracking can include determining a motion vector of the frame pixels with respect to one or more previous frames and one or more subsequent frames. For example, the panning detector can include code for tracking the global velocity vector for a video clip by analyzing, for every $10^{th}$ video frame of the video clip, a frame and its preceding and succeeding frames to determine the velocity of most of the pixels in the frame.

When the panning detector determines that the ratio of the larger-to-smaller magnitudes of orthogonal components of the velocity vector is larger than a predetermined value, the video clip can be classified as containing a linear pan along the direction of the larger component of the velocity vector. For example, if a magnitude of a first component of the velocity is more than 10 times larger than a magnitude of a second component of the velocity (the second component perpendicular to the first component,) then the video clip can be tagged to indicate presence of linear panning along the direction of the first component of the velocity.

Referring to video clip 480 in the example illustrated in FIG. 4E, the first component of the velocity, Vx, corresponds to the horizontal direction, such that the video clip 480 can be classified as a video clip containing horizontal panning, and can be presented to the user along with a tag 488 to indicate presence of the horizontal panning. Referring next to video clip 484 in the example illustrated in FIG. 4E, the first component of the velocity, Vy, corresponds to the vertical direction, such that the video clip 484 can be classified as a video clip containing vertical panning, and can be presented to the user along with a tag to indicate presence of the vertical panning. Referring next to video clip 482 in the example illustrated in FIG. 4E, the first component of the velocity, V1, corresponds to the diagonal direction from NE to SW, such that the video clip 482 can be classified as a video clip containing diagonal panning, and can be presented to the user along with a tag to indicate presence of the diagonal panning.

In general, the panning detector can determine the time dependence of the orthogonal components of the velocity vector. By integrating the determined components, the panning detector can determine a panning path (or trajectory) of the pixel motion. For example, the panning detector can determine a panning path having arched (e.g., parabolic) shape that follows a football kicked from one end of the football field to the other end. In another example, the panning detector can determine panning path having arched (e.g., circular) shape that follows a gondola of a Ferris Wheel along a full (or a portion of a) rotation cycle. Referring to video clip 486 in the example illustrated in FIG. 4E, the panning detector can determine the football's parabolic trajectory as it was captured by a camera, such that the video clip 486 can be classified as a video clip containing arched panning, and can be presented to the user along with a tag to indicate presence of the arched panning.

In some implementations, the "Panning" shot placeholder 476 can have a control 487 for transitioning to one of the available shot placeholders "Panning—horizontal", "Panning—vertical", "Panning—diagonal" and "Panning—arched" corresponding to a first hierarchical sublevel of the video clip classification based on the keyword "Panning". For example, instead of the user performing a "drag and drop" of the representation 481 of the video clip 480 onto the shot placeholder 476, the user can instruct GUI 400 through the control 487 to replace the "Panning" shot placeholder 436 with the "Panning—horizontal" shot place holder. Additional hierarchical sublevels may be available for the video clip classification based on the keyword "Panning". For example, shot placeholders "Panning—horizontal—left-to-right" and "Panning—horizontal—right-to-left" correspond to the first hierarchical sublevel of the video clip classification based on the keyword "Panning—horizontal," or equivalently corresponding to the second hierarchical sublevel of the video clip classification based on the keyword "Panning." The one of two orientations available along a determined panning path (e.g., horizontal—left-to-right vs. right-to-left) can be identified by the panning detector described above as the one of two orientations in which the velocity vector points along the path of the pixel motion.

Figure 4F:
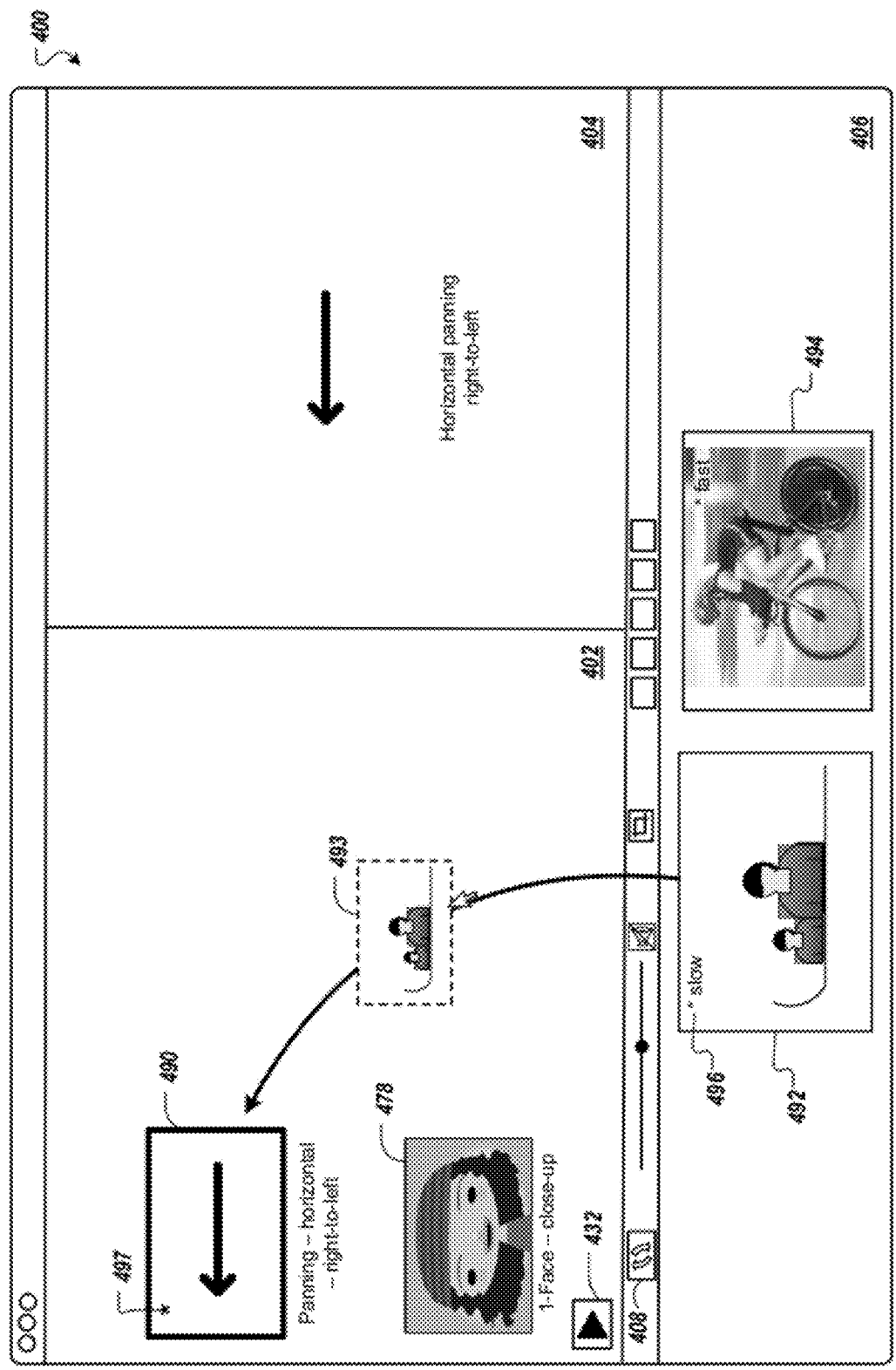

FIG. 4F shows another instance of the example graphical user interface 400 for customizing the movie template. The shot placeholder area 402 includes a shot placeholder 490 which has not been filled-in and corresponds to the keyword "Panning—horizontal—right-to-left." In the example illustrated in FIG. 4F, the unfilled shot placeholder 490 associated with the keyword "Panning—horizontal—right-to-left" contains a generic representation of right-to-left horizontal panning. Upon user selection of the "Panning—horizontal—right-to-left" shot placeholder 490, video clips displayed in the user video clip area 406 can be filtered to display shots that contain right-to-left horizontal pans. For example, the video clip area 406 includes the video clip 492 that depicts a slow, right-to-left horizontal pan and video clip 494 that depicts a fast, right-to-left horizontal pan. The filtered video clips can be presented to the user along with tags corresponding to the respective speeds of the right-to-left horizontal pans. For example, the tag 496 of video clip 492 includes the word "slow" corresponding to the classification of video clip 492 as a video clip that contains slow, right-to-left horizontal panning.

Moreover, a user can select video clip 492, for example, and can "drag and drop" a representation 493 of the video clip 492 onto the shot placeholder 490. As described above in connection with FIG. 4, the preview area 404 can be used to preview a video clip associated with a selected shot placeholder. For example, an animated representation can be shown in the preview area 404, in response to selection by the user of the un-filled "Panning—horizontal—right-to-left" shot placeholder 476, to emphasize a notion of camera panning horizontally from right to left. After the "Panning—horizontal—right-to-left" shot placeholder 490 has been filled by the user, the content of the video clip that occupies the "Panning—horizontal—right-to-left" shot placeholder 490 can be played in the preview area 404 upon selection of control 432.

The analysis described above in connection with FIG. 4E includes detecting camera pans in the plurality of video clips in the video library and classifying video clip ranges to indicate the presence of panning along specific trajectories (e.g., horizontal, vertical, diagonal, arched) and orientations along a specific trajectory (e.g., horizontal left-to-right, horizontal right-to-left, etc.). Further, a rate (i.e., the magnitude of the velocity component along the path of motion) determined by the panning detector as described above in connection with FIG. 4E can be used to differentiate between pans along the same direction (path/trajectory) that have the same orientation. For example, a "slow pan" can have camera panning at rates slower than a predetermined value, and a "fast pan" can have camera panning at rates faster than the predetermined value. Accordingly, a slow pan or a fast pan identified in the forgoing manner corresponds to a third hierarchical sublevel of the video clip classification based on the keyword "Panning" Equivalently, the classification hierarchy for the "Panning" keyword is three sublevels deep: Panning→DIRECTION→ORIENTATION→RATE. The level DIRECTION includes categories such as horizontal, vertical, etc.; the level ORIENTATION includes categories such as left-to-right and right-to-left in the horizontal direction, etc.; the level RATE includes categories such as fast and slow.

In some implementations, the "Panning—horizontal—right-to-left" shot placeholder 490 can have a control 497 for transitioning to one of the available shot placeholders "Panning—horizontal—right-to-left—slow" and "Panning—horizontal—right-to-left—fast" corresponding to the first hierarchical sublevel of the video clip classification based on the keyword "Panning—horizontal—right-to-left," or equivalently corresponding to the third hierarchical sublevel of the video clip classification based on the keyword "Panning" as described above. For example, instead of the user performing a "drag and drop" of the representation 493 of the video clip 492 onto the shot placeholder 490, the user can instruct GUI 400 through the control 497 to replace the "Panning—horizontal—right-to-left" shot placeholder 490 with the "Panning—horizontal—right-to-left—slow" shot place holder or with the "Panning—horizontal—right-to-left—slow" shot place holder.

Figure 5:
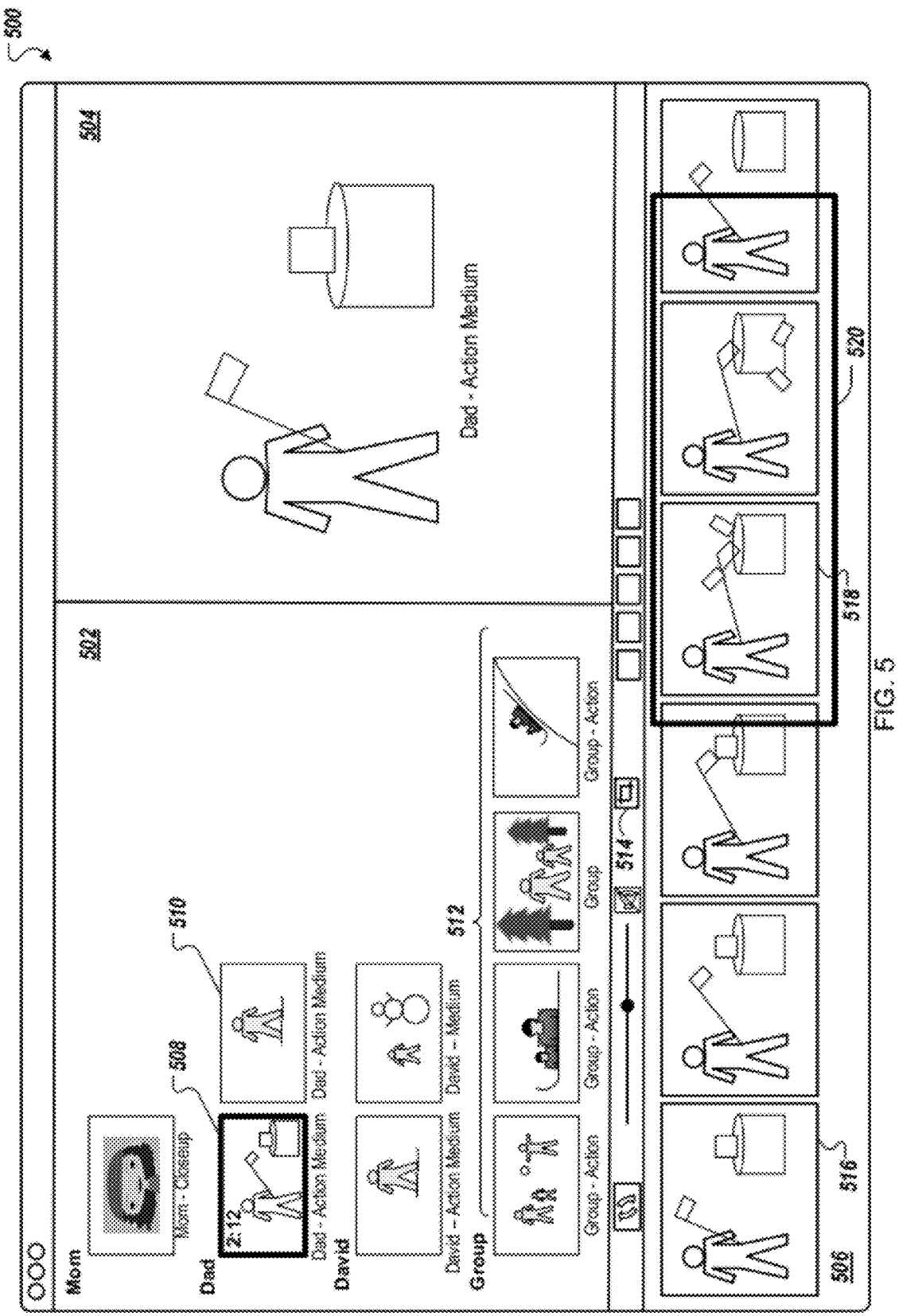

FIG. 5 is another example graphical user interface 500 for customizing a movie template. The GUI 500 includes shot placeholder area 502, preview area 504 and video clip trimming area 506. The preview area 504 can be used to display a preview of a video clip selected for a shot placeholder, such as a preview of the video clip selected for shot placeholder 508.

The shot placeholder area 502 displays a view of shot placeholders sorted by cast member. For example, shot placeholders 508 and 510 with associated video clips of "Dad" can be grouped together, and shots of other cast members similarly can be grouped by cast member. Group shots including more than one cast member can be grouped together in a bottom group 512. In some implementations, a "miscellaneous" group can include shots that do not include cast members.

As mentioned above, in some implementations, if a user video clip selected for a shot placeholder is longer in duration than the time associated with the shot placeholder, the user can customize the portion of the user video clip used in the generated movie. For example, with a shot placeholder selected, the user can select trimming control 514. In response to the selection of the trimming control 514, video frames included in the video clip associated with the selected shot placeholder, such as video frames 516 and 518, can be displayed in the video clip trimming area 506. A selection box 520 can be displayed, and can have a length corresponding to the duration of the selected shot placeholder (e.g., the length of the selection box 520 can correspond to a duration of two seconds and twelve milliseconds associated with the selected shot placeholder 508). The user can slide the selection box 520 left or right, to indicate which video frames to use for the playing of a video segment associated with the selected shot placeholder.

Figure 6:
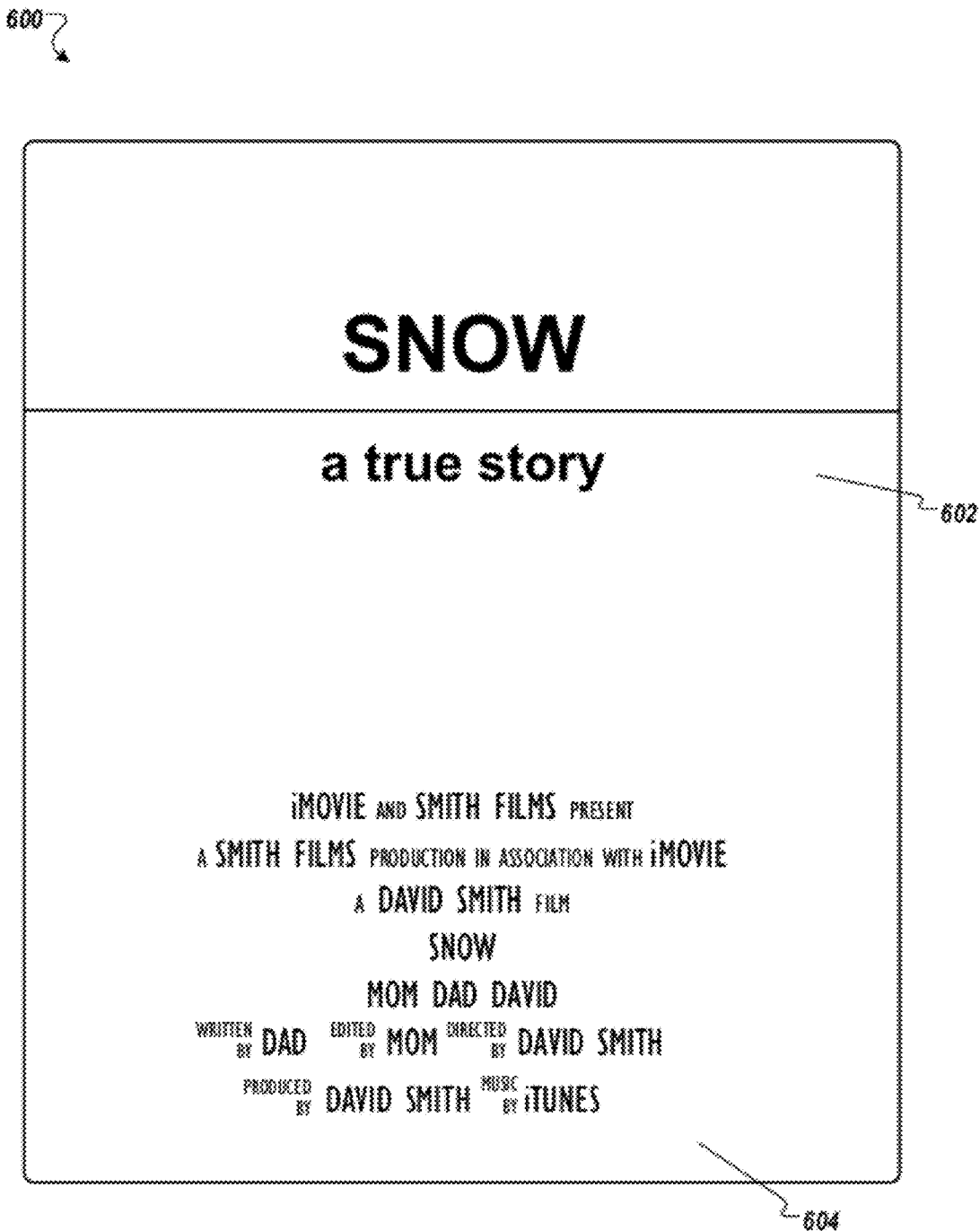
FIG. 6 shows an example of an automatically generated movie poster.

FIG. 6 shows an automatically generated movie poster 600 that can be created for a user generated movie created using movie templates as described above. The movie poster 600 can be used to represent a movie generated using movie templates within a graphic user interface (GUI) associated with a movie or media library, or within a file storage system. For example, a GUI for a media library can display various music, movie, and other video files. In some cases, the media library can include user generated media (e.g., movies created using movie templates) as well as commercial media purchased by a user. In some cases, the media library can include only user generated media. The GUI for the media library can show cover art representing various media items, such as movie or CD covers. The movie poster 600 can be automatically generated for a movie and displayed as cover art for the movie within the media library. As another example, a collection of video files can be viewed within a folder of a file system. A user can select a "thumbnail view" in order to view thumb nails of images associated with each of the video files. The automatically generated movie poster 600 can be displayed as a thumbnail image for the movie from which the movie poster 600 was generated.

In some implementations, the movie poster 600 can be generated by selecting a title screen from a title sequence of the movie. The title screen can be used as a top portion 602 of the movie poster 600. In some implementations, an appropriate title screen can be identified based on the position, time-wise, of the title screen within the movie, and/or text recognition software. In some implementations, if a movie for which the movie poster 600 was generated was created using movie templates, a title screen created using a title screen template can be identified and used as the top portion 602.

A credits screen can additionally be identified for use as a bottom portion 604 of the movie poster 600. In some implementations, an appropriate credits screen can be identified based on the position, time-wise, of the credits screen within the movie, and/or text recognition software. In some implementations, if a movie for which the movie poster 600 was generated was created using movie templates, a credits screen created using a credits screen template can be identified and used as the bottom portion 604. An identified title screen and identified credits screen can be combined to form the movie poster 600.

In some implementations, an image (e.g., a screen shot) can be selected from the movie and used as a background image for the movie poster 600. Additionally, other graphics or images can be automatically inserted into the movie poster 600. In some implementations, after the movie poster 600 is automatically generated, a user can be allowed to select an image (either from the movie, or from a collection of user images) to use as a background image for the movie poster 600. In some implementations, the user can edit portions of the text or other features of the movie poster 600. For example, the user can change the position of text or images included in the movie poster 600, or change a font for some or all of the text of the movie poster 600. In some implementations, the user can select from a library of effects or graphics that can be included in the movie poster 600.

Figure 7:
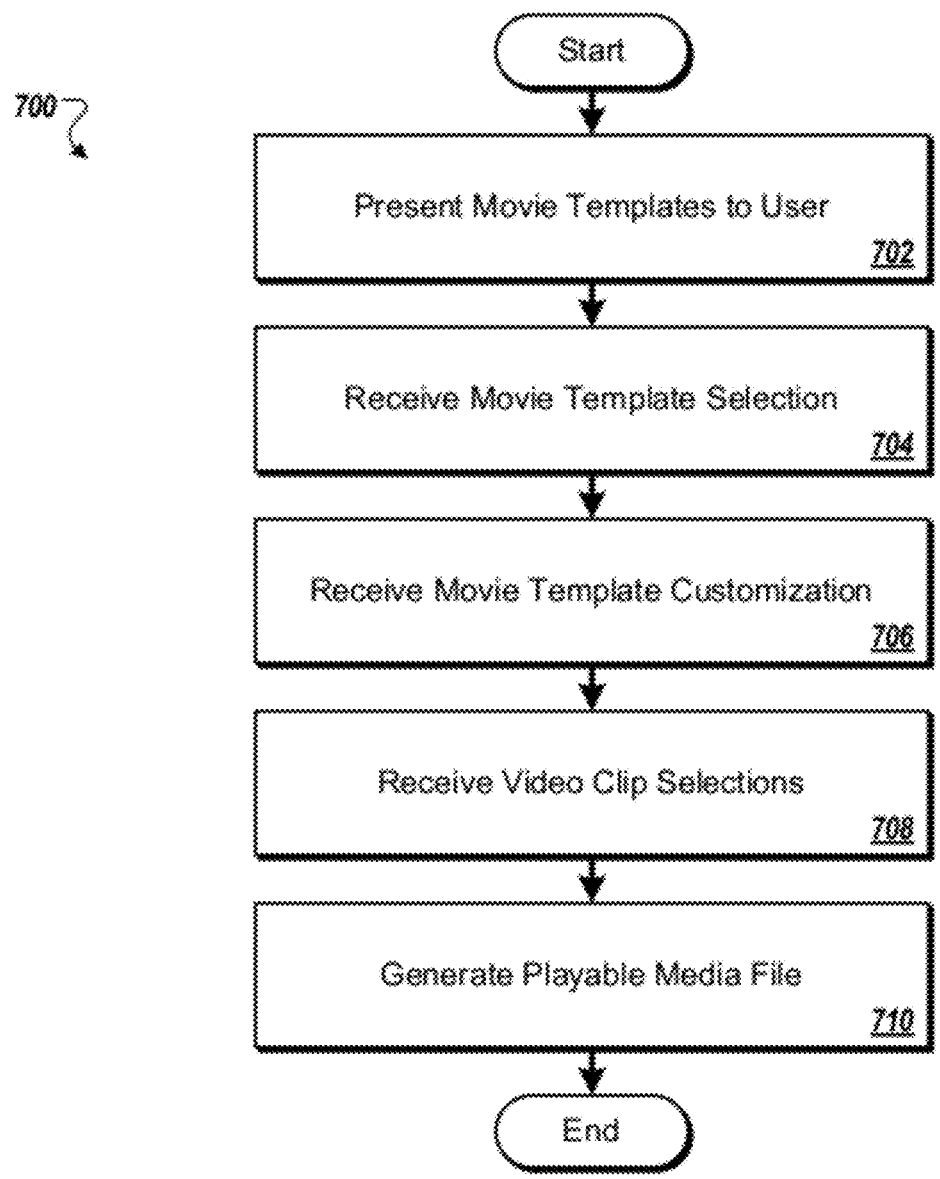
FIG. 7 is a flowchart of a process for generating a movie based on user customizations to a movie template.

FIG. 7 is a flowchart of a process 700 for generating a movie based on a movie template. The first step 702 in the process 700 is the presentation of movie templates to a user. For example, the user can be presented with a list of available movie templates, where each movie template is named according to a corresponding theme. In some implementations, the GUI 200 of FIG. 2 can be presented.

Next, at step 704, a movie template selection is received. For example, in some implementations, the user can select a movie template using the GUI 200 of FIG. 2. A movie template can include, among other settings, a sequence of shot placeholders that each includes graphical indicia representing one or more desirable characteristics specific to that shot placeholder.

In step 706, movie template customizations are received. For example, the user can, using the GUIs 300, 400, and 500 of FIGS. 3-5, customize various parameters of the movie template, such as a movie title, subtitle, season, year, studio logo and one or more cast members, quotes, awards, or credits, to name a few examples.

At step 708, video clip selections are received. For example, the user can use an interface (e.g., GUI 400 of FIG. 4) to select a user video clip for each shot placeholder. The user can also specify a portion of the user video clip to be used (e.g., using GUI 500 of FIG. 5).

In step 710, a playable media file representing a movie is generated, based on the information received from the user. The playable media file can include video segments that feature user-specified text (e.g., title, subtitle, section headings, studio name, one or more cast member names, one or more awards), as well as one or more graphical representations of awards and studio information. The playable media file can include a credits screen (e.g., as a last video clip), which can be formatted to appear similar to credits shown in production movies, and can include the name of a user-specified studio and can display roles attributed to one or more user-specified cast members.

The playable media file can include voice-overs and background music complementary to the video and timed to transitions between video clips. The playable media file can include the audio of user-selected video clips, if indicated by the user. The playable media file can also include effects (e.g., fade-to-black, zoom-in, text animation, slow-motion) automatically applied to user-specified video clips.

In some implementations, the process 700 can include more or less steps, or the steps can be performed in a different order. For example, the step 708 of receiving video clip selections can be performed before step 706 of receiving movie template customizations.

Figure 7B:
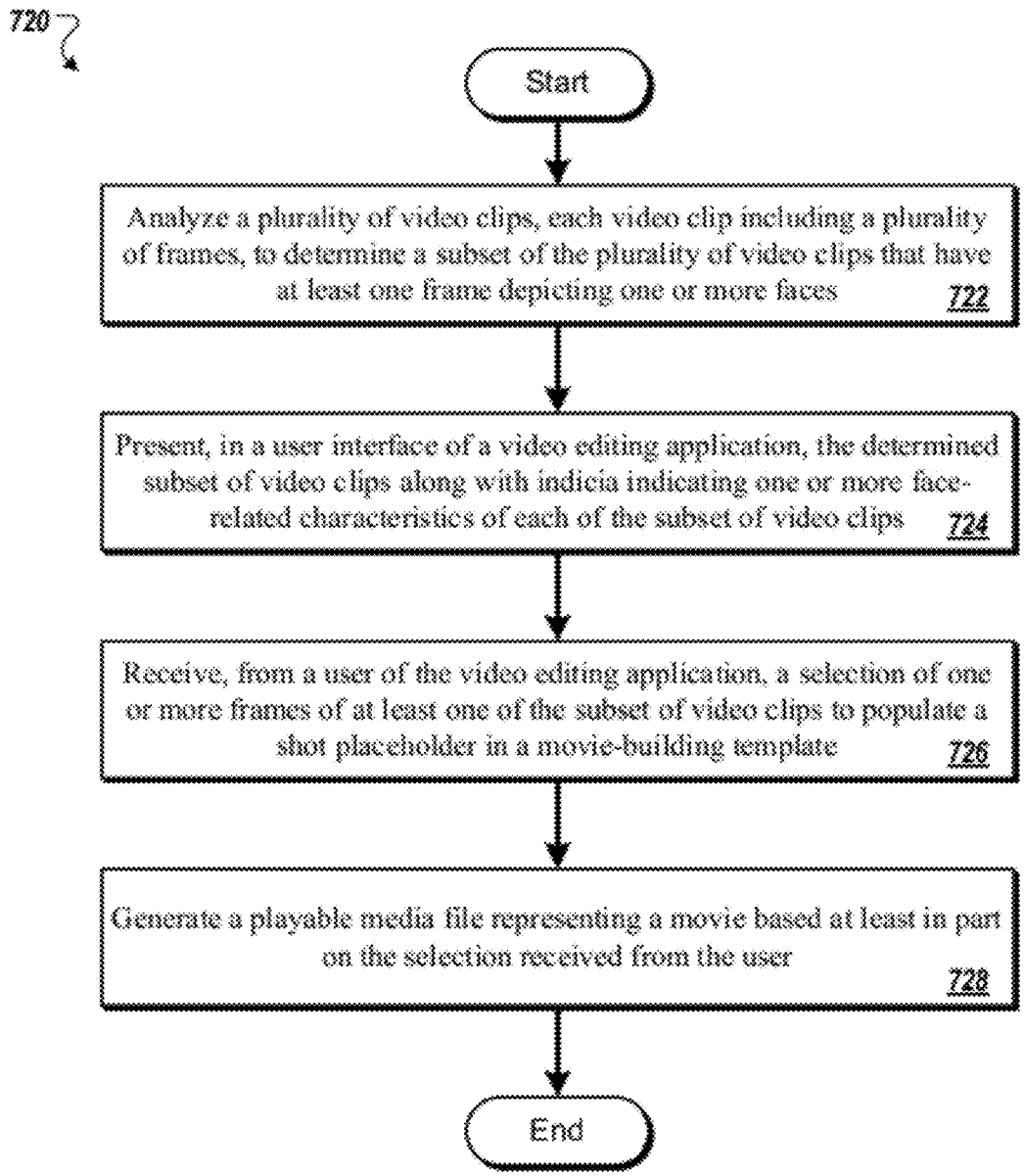
FIG. 7B is a flowchart of a process for generating a movie using video clips that are classified based on characteristics of faces depicted in the video clips.

FIG. 7B is a flowchart of another process 720 for generating a movie based on a movie-building template. At 722, a plurality of video clips, each video clip including a plurality of frames, is analyzed to determine a subset of the plurality of video clips that have at least one frame depicting one or more faces. In some implementations, the analysis can be performed responsive to accessing by a video editing application of a library of video clips including the plurality of video clips. In some implementations, the analysis can be performed upon downloading the video clips to the library of video clips. Further, the analysis can include detecting the one or more faces in the at least one frame of the subset of the plurality of video clips, and determining a relative amount of frame space occupied by the detected one or more faces.

In some implementations, the analysis can include classifying the subset of the plurality of video clips as a one-face shot when a single face is detected in the at least one frame of the subset of the plurality of video clips; classifying the subset of the plurality of video clips as a two-face shot when two faces are detected in the at least one frame of the subset of the plurality of video clips; and classifying the subset of the plurality of video clips as a group shot when three or more faces are detected in the at least one frame of the subset of the plurality of video clips.

At 724, the determined subset of video clips is presented, in a user interface of the video editing application, along with indicia indicating one or more face-related characteristics of each of the subset of video clips. In some implementations, the one or more face-related characteristics indicated by the presented indicia include quantity of faces detected in the at least one frame of the subset of the plurality of video clips. In some implementations, the one or more face-related characteristics indicated by the presented indicia further include information relating to the determined relative amount of frame space occupied by the detected one or more faces. In some implementations, the detected one or more faces can be inscribed in respective rectangles. To determine the relative amount of the frame space occupied by the detected one or more faces, a ratio of a sum of pixels included in the respective rectangles which inscribe the detected faces and the total pixels in a frame can be obtained.

When a single face is detected in the at least one frame of the subset of the plurality of video clips, the subset of the plurality of video clips can be classified as (i) a close-up one-face shot if the determined relative amount of frame space occupied by the detected single face is larger than or equal to a first predetermined relative amount; (ii) a medium one-face shot if the determined relative amount of frame space occupied by the detected single face is less than the first predetermined relative amount and more than or equal to a second predetermined relative amount; and (iii) a wide one-face shot if the determined relative amount of frame space occupied by the detected single face is less than the second predetermined relative amount. For example, the first and second predetermined relative amounts may be 30% and 17%, respectively.

When two faces are detected in the at least one frame of the subset of the plurality of video clips, the subset of the plurality of video clips can be classified as (iv) a close-up two-face shot if the determined relative amount of frame space occupied by the detected two faces is larger than or equal to a third predetermined relative amount; (v) a medium two-face shot if the determined relative amount of frame space occupied by the detected two faces is less than the third predetermined relative amount and more than or equal to a fourth predetermined relative amount; and (vi) a wide two-face shot if the determined relative amount of frame space occupied by the detected two faces is less than the fourth predetermined relative amount. For example, the third and fourth predetermined relative amounts may be 40% and 27%, respectively.

When a group of three or more faces is detected in the at least one frame of the subset of the plurality of video clips, the subset of the plurality of video clips can be classified as (vii) a close-up group shot if the determined relative amount of frame space occupied by the detected group of faces is larger than or equal to a fifth predetermined relative amount; (viii) a medium group shot if the determined relative amount of frame space occupied by the detected group of faces is less than the fifth predetermined relative amount and more than or equal to a sixth predetermined relative amount; and (ix) a wide group shot if the determined relative amount of frame space occupied by the detected group of faces is less than the sixth predetermined relative amount. For example, the fifth and sixth predetermined relative amounts may be 50% and 37%, respectively.

In some implementations, a single indicium can be associated with each video clip of the determined subset of the plurality of video clips. The associated single indicium can indicate the one or more face-related characteristics of each video clip of the determined subset of video clips. In some implementations, indicia can be associated with respective frames included in each video clip of the determined subset of the plurality of video clips. The associated indicia can indicate the one or more face-related characteristics of the respective frames included in each video clip of the determined subset of video clips.

In some implementations, the determined subset of video clips can be filtered based on characteristics of the shot placeholder in the movie template to obtain a filtered subset of the determined subset. In some implementations, the presentation of the determined subset of video clips can include presentation of additional indicia along with the filtered subset of the determined subset. In some implementations, the presentation of the determined subset of video clips can include presentation of only the filtered subset of the determined subset.

At 726, a selection of one or more frames of at least one of the subset of video clips is received, from a user of the video editing application, to populate a shot placeholder in a movie-building template. For example, the user can, using the GUI 400 of FIGS. 4, 4B-4D, select various movie clips to populate shot placeholders of the movie template. The selection can be based on indicia relating to the quantity of detected faces contained in a movie clip and to the type of angle shot.

At 728, a playable media file representing a movie is generated, based at least in part on the selection received from the user. The playable media file can include video segments that feature a user-specified quantity of faces (e.g., one face, two faces, or a group of three or more detected faces,) as well as various angle shot types (e.g., close-up shots of one, two or a group of faces, medium shots of one, two or a group of faces, or wide angle shots of one, two or a group of faces).

Figure 8:
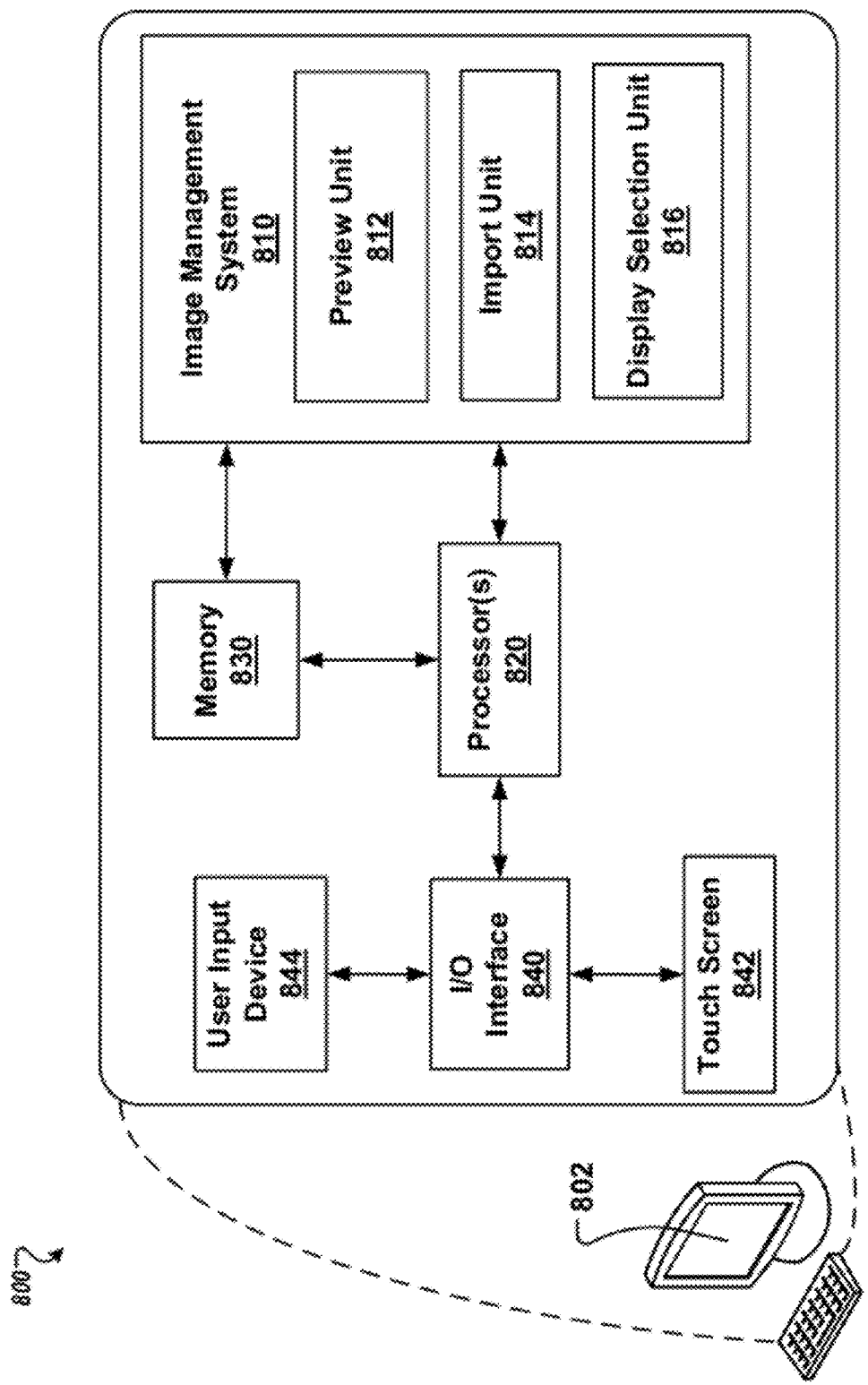
FIG. 8 is a block diagram of a computing device and system that can be used to implement techniques described with respect to FIGS. 1-6.

FIG. 8 is a block diagram of a computing device and system 800 that can be used to implement the techniques described with respect to FIGS. 1-6. The system 800 can include a processor 820 to control operation of the system 800 including executing any machine or computer readable instructions. The processor 820 can communicate with a memory or data storage unit 830 that can store data, such as image files and machine or computer readable instructions. Also, the processor 820 can communicate with an image management system 810 to manage different image files including import, export, storage, image adjustment, metadata application and display of the image files. The processor 820 can communicate with an input/output (I/O) interface 840 that can interface with different input devices, output devices or both. For example, the I/O interface 840 can interface with a touch screen 842 on a display device 802. Also, the I/O interface 840 can interface with a user input device 844 such as a keyboard, a mouse, a trackball, etc. that are designed to receive input form a user.

Figure 9:
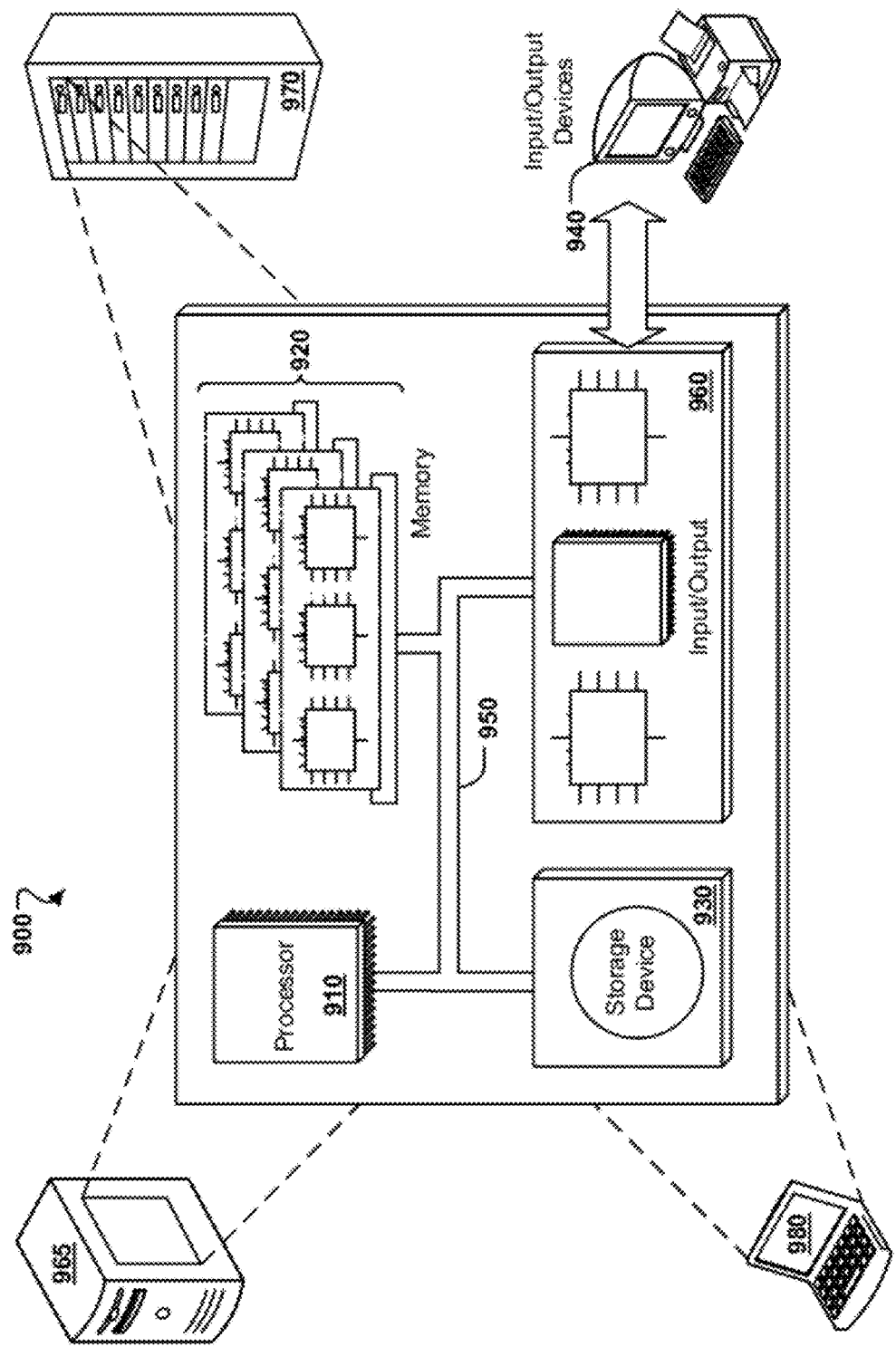
FIG. 9 is a block diagram of another computing device and system that can be used to implement techniques described with respect to FIGS. 1-6.

FIG. 9 is a block diagram of another computing device and system that can be used, e.g., to manage the display of movable elements of a user interface as described with respect to FIGS. 1-6. Computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 900 includes a processor 910, memory 920, a storage device 930, a high-speed interface 950 connecting to memory 920. The computing device can also include high-speed expansion ports (not shown), and a low speed interface (not shown) connecting to low speed bus (not shown) and storage device 930. Each of the components 910, 920, 930, 950, and 920, are interconnected using various busses, and can be mounted on a common motherboard or in other manners as appropriate. The processor 910 can process instructions for execution within the computing device 900, including instructions stored in the memory 920 or on the storage device 930 to display graphical information for a GUI on an external input/output device, such as display 940 coupled to an input/output interface 960. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

The memory 920 stores information within the computing device 900. In one implementation, the memory 920 is a computer-readable medium. In one implementation, the memory 920 is a volatile memory unit or units. In another implementation, the memory 920 is a non-volatile memory unit or units.

The storage device 930 is capable of providing mass storage for the computing device 900. In one implementation, the storage device 930 is a computer-readable medium. In various different implementations, the storage device 930 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 920, the storage device 930, memory on processor 910, or a propagated signal.

The high speed controller 950 manages bandwidth-intensive operations for the computing device 900, while the low speed controller manages lower bandwidth-intensive operations. Such allocation of duties is exemplary only. In one implementation, the high-speed controller 950 is coupled to memory 920, display 940 (e.g., through a graphics processor or accelerator), and to high-speed expansion ports (not shown), which can accept various expansion cards (not shown). In the implementation, low-speed controller (not shown) is coupled to storage device 930 and low-speed expansion port (not shown). The low-speed expansion port, which can include various communication ports (e.g., USB, Bluetooth, Ethernet, wireless Ethernet), can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 965, or multiple times in a group of such servers. It can also be implemented as part of a rack server system 970. In addition, it can be implemented in a personal computer such as a laptop computer 980.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method performed by one or more processes executing on a computer system, the method comprising:
    analyzing a plurality of video clips, each video clip comprising a plurality of frames, to determine a subset of the plurality of video clips that have at least one frame depicting one or more faces;
    analyzing of video clips that have at least one frame with the faces to determine a quantity of faces in each video clip and a shot type of the faces, wherein determining the shot type includes:
        measuring a relative amount of frames space occupied by a rectangle provided around the one or more faces; and
        assigning the shot type to the video clip based on the measurement;
    presenting, in a user interface of a video editing application, the determined subset of video clips along with indicia indicating one or more face-related characteristics of each of the subset of video clips and a movie building template including a plurality of shot placeholders, each shot placeholder representing video content a movie that is generated based on the movie building template;
    receiving, from a user of the video editing application, a selection of a shot placeholder;
    in response to the selection of the shot placeholder, filtering the presented subset of video clips in the user interface to present video clips that include a shot type associated with the selected shot placeholder;
    receiving, from the user of the video editing application, a selection of one or more frames of at least one of the subset of video clips to populate the shot placeholder in the movie-building plate; and
    generating a playable media file representing the movie based at least in part on the selection received from the user.

2. The method of claim 1, further comprising:
    performing said analyzing responsive to accessing a library of video clips including the plurality of video clips; and
    said analyzing including detecting the one or more faces in the at least one frame of the subset of the plurality of video clips.

3. The method of claim 2, wherein the one or more face-related characteristics indicated by the presented indicia include quantity of faces detected in the at least one frame of the subset of the plurality of video clips.

4. The method of claim 3, further comprising:
    classifying the subset of the plurality of video clips as a one-face shot when a single face is detected in at least one frame of the subset of the plurality of video clips, classifying the subset of the plurality of video clips as a two-face shot when two faces are detected in the at least one frame of the subset of the plurality of video clips, and classifying the subset of the plurality of video clips as a group shot when three or more faces are detected in the at least one frame of the subset of the plurality of video clips.

5. The method of claim 3, wherein the one or more face-related characteristics indicated by the presented indicia further include information relating to the determined relative amount of frame space occupied by the detected one or more faces.

6. The method of claim 5, further comprising:
    inscribing the detected one or more faces in respective rectangles; and
    said determining the relative amount of the frame space occupied by the detected one or more faces comprising obtaining a ratio of a sum of pixels included in the respective rectangles which inscribe the detected faces and total pixels in a frame.

7. The method of claim 5, further comprising:
    when a single face is detected in the at least one frame of the subset of the plurality of video clips, classifying the subset of the plurality of video clips as a close-up one-face shot if the determined relative amount of frame space occupied by the detected single face is larger than or equal to a first predetermined relative amount, a medium one-face shot if the determined relative amount of frame space occupied by the detected single face is less than the first predetermined relative amount and more than or equal to a second predetermined relative amount, and a wide one-face shot if the determined relative amount of frame space occupied by the detected single face is less than the second predetermined relative amount;

when two faces are detected in the at least one frame of the subset of the plurality of video clips, classifying the subset of the plurality of video clips as a close-up two-face shot if the determined relative amount of frame space occupied by the detected two faces is larger than or equal to a third predetermined relative amount, a medium two-face shot if the determined relative amount of frame space occupied by the detected two faces is less than the third predetermined relative amount and more than or equal to a fourth predetermined relative amount, and a wide two-face shot if the determined relative amount of frame space occupied by the detected two faces is less than the fourth predetermined relative amount; and when a group of three or more faces is detected in the at least one frame of the subset of the plurality of video clips, classifying the subset of the plurality of video clips as a close-up group shot if the determined relative amount of frame space occupied by the detected group of faces is larger than or equal to a fifth predetermined relative amount, a medium group shot if the determined relative amount of frame space occupied by the detected group of faces is less than the fifth predetermined relative amount and more than or equal to a sixth predetermined relative amount, and a wide group shot if the determined relative amount of frame space occupied by the detected group of faces is less than the sixth predetermined relative amount.

8. The method of claim 1, further comprising associating a single indicium with each video clip of the determined subset of the plurality of video clips, the associated single indicium indicating the one or more face-related characteristics of each video clip of the determined subset of video clips.

9. The method of claim 1, further comprising associating indicia with respective frames included in each video clip of the determined subset of the plurality of video clips, the associated indicia indicating the one or more face-related characteristics of the respective frames included in each video clip of the determined subset of video clips.

10. The method of claim 1, wherein filtering the presented subset of video clips includes filtering the present subset of video clips to present filtered video clips that include a quantity of faces associated with the selected shot placeholder.

11. The method of claim 10, wherein said presenting the determined subset of video clips comprises presenting additional indicia along with the filtered subset of the determined subset.

12. The method of claim 10, wherein said presenting the determined subset of video clips comprises presenting only the filtered subset of the determined subset.

13. A system for video editing, the system comprising:
a display; and
data processing apparatus configured to:
analyze a plurality of video clips stored in a storage system communicatively coupled with the video editing system, each video clip comprising a plurality of frames, the analysis of the plurality of video clips being performed to determine a subset of the plurality of video clips that have at least one frame depicting one or more faces;
analyze the video clips that have at least one frame with the faces to determine a quantity of faces in each video clip and a shot type of the faces, wherein determine the shot type includes:
measuring a relative amount of frame space occupied by a rectangle provided around the one or more faces; and
assigning the shot type to the video clip based on the measurement;
present, on the display in a user interface, the determined subset of video clips along with indicia indicating one or more face-related characteristics of each of the subset of video clips and a movie building template including a plurality of shot placeholders, each shot placeholder representing video content for a movie that is generated based on the movie building template;
receive, from a user of the video editing application, a selection of one or more shot placeholders;
in response to the selection of the one or more shot placeholders, filter the presented subset of video clips in the user interface to present video clips that include a shot type associated with the selected shot placeholders;
receive, from the user of the video editing system, a selection of one or more frames of at least one of the subset of video clips to populate the shot placeholder in the movie-building template; and
generate a playable media file representing the movie based at least in part on the selection received from the user.

14. The system of claim 13, wherein the data processing apparatus is configured to perform the analysis of the plurality of video clips upon accessing on the storage system a library of video clips that includes the plurality of video clips, and to perform the analysis of the plurality of video clips, the data processing apparatus is further configured to detect the one or more faces in the at least one frame of the subset of the plurality of video clips, wherein the one or more face-related characteristics indicated by the presented indicia include quantity of faces detected in the at least one frame of the subset of the plurality of video clips.

15. The system of claim 13, wherein the data processing apparatus is further configured to associate a single indicium with each video clip of the determined subset of the plurality of video clips, the associated single indicium indicating the one or more face-related characteristics of each video clip of the determined subset of video clips.

16. The system of claim 13, wherein the data processing apparatus is further configured to associate indicia with respective frames included in each video clip of the determined subset of the plurality of video clips, the associated indicia indicating the one or more face-related characteristics of the respective frames included in each video clip of the determined subset of video clips.

17. A non-transitory computer readable medium encoded with instructions that when executed by data processing apparatus cause the data processing apparatus to perform operations comprising:
analyzing a plurality of video clips, each video clip comprising a plurality of frames,
to determine a subset of the plurality of video clips that have at least one frame depicting one or more faces;

analyzing of video clips that have at least one frame with the faces to determine a quantity of faces in each video clip and a shot type of the faces, wherein determining the shot type includes:

measuring a relative amount of frame space occupied by a rectangle provided around the one or more faces; and assigning the shot type to the video clip based on the measurement;

presenting, in a user interface, the determined subset of video clips along with indicia indicating one or more face-related characteristics of each of the subset of video clips and a movie building template including a plurality of shot placeholders, each shot placeholder representing video content for a movie that is generated based on the movie building template;

receiving, from a user of the video editing application, a selection of one or more shot placeholders;

in response to the selection of one or more shot placeholders, filtering the presented subset of video clips in the user interface to present video clips that include a shot type of faces associated with the selected shot placeholders;

receiving, from the user through the user interface, a selection of one or more frames of at least one of the subset of video clips to populate the shot placeholder in the movie-building template; and generating a playable media file representing the movie based at least in part on the selection received from the user.

18. The non-transitory computer readable medium of claim 17, encoded with further instructions that when executed by the data processing apparatus cause the data processing apparatus to perform operations comprising filtering the determined subset of video clips based on characteristics of a quantity of faces of the shot placeholder in the movie template to obtain the filtered video clips.

19. The non-transitory computer readable medium of claim 18, wherein said presenting the determined subset of video clips comprises presenting additional indicia along with the filtered subset of the determined subset.

20. The non-transitory computer readable medium of claim 18, wherein said presenting the determined subset of video clips comprises presenting only the filtered subset of the determined subset.

21. A method performed by one or more processes executing on a computer system, the method comprising:

analyzing a plurality of video clips, each video clip comprising a plurality of frames, to determine a subset of the plurality of video clips that have at least one frame depicting one or more faces;

analyze the video clips that have at least one frame with the faces to determine a quantity of faces in each video clip and a shot type of the faces, wherein determining the shot type includes:

measuring a relative amount of frame space occupied by a rectangle provided around the one or more faces; and assigning the shot type to the video clip based on the measurement;

receiving, from a user of the video editing application, a selection of a shot placeholder from a movie-building template including one or more shot placeholders;

presenting, in a user interface of a video editing application, a subset of video clips that have faces, the subset of video clips including face-related characteristics that correspond to face-related characteristics of the selected shot placeholder;

receiving, from the user of the video editing application, a selection of one or more frames of the presented subset of video clips to populate the selected placeholder; and generating a playable media file representing a movie based at least in part on the selection received from the user.

22. The method of claim 21, wherein the analysis to determine the quantity of faces in each video clip is performed on every Nth frame of the video clip, N being greater than one.

23. The method of claim 21, wherein the face-related characteristics of the selected shot placeholder include at least one of a quantity of faces in a frame and a shot type of the faces in the frame.

* * * * *